United States Patent [19]
DeFilippi

[11] Patent Number: 5,580,770
[45] Date of Patent: Dec. 3, 1996

[54] SUPPORT CONTAINING PARTICULATE ADSORBENT AND MICROORGANISMS FOR REMOVAL OF POLLUTANTS

[75] Inventor: Louis J. DeFilippi, Cook, Ill.

[73] Assignee: AlliedSignal Inc.

[21] Appl. No.: 174,587

[22] Filed: Dec. 27, 1993

Related U.S. Application Data

[63] Continuation of Ser. No. 878,105, May 4, 1992, abandoned, which is a continuation-in-part of Ser. No. 763,735, Sep. 23, 1991, abandoned, which is a continuation-in-part of Ser. No. 430,709, Nov. 2, 1989, abandoned.

[51] Int. Cl.$^6$ .......................... C12N 11/08; C12S 13/00; B09B 3/00; C02F 3/00
[52] U.S. Cl. .......................... 435/180; 210/615; 210/616; 435/176; 435/177; 435/181; 435/262.5
[58] Field of Search .................................... 435/176, 177, 435/178, 180, 181, 262.5; 210/609, 615, 616, 617

[56] References Cited

U.S. PATENT DOCUMENTS

| | | | |
|---|---|---|---|
| 3,904,518 | 9/1975 | Hutton et al. | 210/11 |
| 4,045,609 | 8/1977 | Mary | 428/253 |
| 4,046,939 | 9/1977 | Mary | 428/311 |
| 4,069,148 | 1/1978 | Hutton et al. | 210/11 |
| 4,566,971 | 1/1984 | Reimann et al. | 210/616 |
| 4,634,672 | 1/1987 | Baumgarten et al. | 435/182 |
| 4,681,851 | 7/1987 | Baumgarten et al. | 435/262 |
| 4,681,852 | 7/1987 | Tribe | 435/108 |
| 4,843,105 | 6/1989 | Reischl et al. | 521/54 |
| 4,983,299 | 1/1991 | Lupton et al. | 210/609 |
| 5,057,221 | 10/1991 | Bryant et al. | 210/617 |
| 5,217,616 | 6/1993 | Sonyal et al. | 210/617 |

FOREIGN PATENT DOCUMENTS

| | | |
|---|---|---|
| 0210478A2 | 2/1987 | European Pat. Off. . |
| WO90/11970 | 10/1990 | WIPO . |

OTHER PUBLICATIONS

Federal Register, vol. 52, No. 214, pp. 42522–42584 (Nov. 5, 1987).
Thomas et al., "Microbial ecology of the subsurface at an abandoned creoso waste site", J. of Industrial Microbiology, vol. 4, pp. 109–120 (1989).
Battersby et al., "Survey of the Anerobic Biodegradation Potential of Organic Chemicals in Digesting Sludge", Applied and Environmental Microbiology, vol. 55, No. 2, pp. 433–439 (Feb. 1989).
Heidman et al., "Pilot–Plant Evaluation of Porous Biomass Supports", J. Environ. Eng., pp. 1077–1096 (1988).
Morsen et al., "Degredation of phenol by a mixed culture of Pseudomonas putida and Cryptococcus elinovii adsorbed on activated carbon", Appl. Microbiol Biotechnol, vol. 26, pp. 238–288 (1987).
Wang et al., "Anaerobic treatment of phenol by an expanded–bed reactor", Journal WPCF, vol. 58, No. 3, pp. 227–233 (Mar. 1986).
Fox et al., "Anaerobic treatment of a biologically inhibitory wastewater" Journal WPCF, vol. 60, No. 1, pp. 86–92 (Jan. 1988).
Calcutt et al., "Sludge Processing–Choices for Tomorrow", Journal of the Institute of Water Pollution Control, vol. 86, No. 2, pp. 235–236 (1987).
Givens et al., Evaluation of Carbon Impregnated Polyurethane Foam Media for Biological Removal of Carbon and Nitrogen From Chemical Industry Waste–Water, 42nd Purdue University Industrial Waste Conference Proceedings, pp. 93–102.
Anselmo et al., "Degradation of Phenol by Immobilized Cells of Fusarium flocciferum", Biotechnology Letters, vol. 7, No. 12, pp. 889–894 (1985).
Bettmann et al., "Continuous degradation of phenol (s) by Pseudomonas putid P8 entrapped in polyacrylamide–hydrazide", App. Microbiol Biotechnol, vol. 22 pp. 389–393 (1985).
Alsop et al., "Improved thermal sludge conditioning by treatment with acid and bases", Journal WPCF, vol. 54, No. 2, p. 146.
The Municipal Waste Landfill Crisis and a Response of New Technology, Prepared by U.S. Building Corporation, pp. 3–17, (Nov. 1988).
Jewell, "Anaerobic sewage treatment", American Chemical Society, vol. 21, No. 1, pp. 14–15 (1987).
Ehrhardt et al. "Phenol degradation by microorganisms adsorbed on activated carbon", Appl. Microbiol Biotechnol, vol. 21, pp. 32–36 (1985).

*Primary Examiner*—David M. Naff
*Attorney, Agent, or Firm*—Harold N. Wells

[57] ABSTRACT

A biologically active support for removing pollutants from a fluid stream such as waste water is prepared. The support is formed of a polymeric foam substrate coated with a composition containing a particulate adsorbent which adsorbs, then releases pollutants, and a polymeric binder that binds the adsorbent to the surface of the substrate. The binder contains a suspension aid, and one or more pollutant-degrading microorganisms are adhered to the surface of the coated support. The binder preferably has a $T_g$ of lower than or equal to about 250° C. and may be a latex. Examples of suspension aids are surfactants and polyanionic polypeptides such as ammonium caseinate. The adsorbent is preferably a carbon material such as coal, charcoal, carbon black and activated carbon. Other adsorbents are silica gel, active clays, zeolites, hydrophobic and ion exchange resins, and molecular sieves. To remove pollutants, the biologically active support is placed in a reactor and a fluid stream containing a pollutant such as phenol is passed through the reactor where the pollutant is degraded by the microorganism and adsorbed to the adsorbent. The adsorbent acts as a buffer by adsorbing excess pollutant from solution when the pollutant concentration increases and when the pollutant concentration decreases releases pollutant into solution where the microorganism degrades the pollutant.

6 Claims, 4 Drawing Sheets

SUPPORT CONTAINING PARTICULATE ADSORBENT AND MICROORGANISMS FOR REMOVAL OF POLLUTANTS

RELATED APPLICATIONS

This application is a continuation of application Ser. No. 07/878,105, filed May 4, 1992 which is a continuation-in-part of application Ser. No. 07/763,735, filed Sep. 23, 1991, which is a continuation-in-part of application Ser. No. 07/430,709, filed Nov. 2, 1989, all now abandoned.

Application Ser. No. 07/430,709 is related to application Ser. No. 07/335,610, filed Apr. 10, 1989, now U.S. Pat. No. 4,983,299.

BACKGROUND OF THE INVENTION

Field of the Invention

This invention relates generally to an adsorbent coated biologically active support for use in biological processes for the purification of waste streams, as for example industrial and municipal waste waters and to products, apparatuses and processes for use of such media. More particularly, the present invention relates to coating compositions for use in preparing such support media. The coating compositions comprise a binder, an aqueous solvent and a suspension aid and an adsorbent material, capable of absorbing pollutants and promoting their subsequent biodegradation by microorganisms attached and immobilized to the support media. The coating composition may also include a settlement retardant, which prevent adsorbent from settling out of the coating formulation.

Another embodiment of the invention relates to an apparatus for removal of a desired material from a fluid stream comprising a vessel which comprises an inlet and outlet means for inflow and outflow of said fluid stream; wherein said vessel comprises a plurality of biologically active biomass support materials of this invention.

An additional embodiment relates to a method for the removal of a desired material from a fluid stream comprising the desired material; said method comprising contacting a fluid stream with a plurality of biologically active biomass support materials of this invention. It is noted that the various materials and methods of this invention described herein can be used to remove inorganic and organic materials from fluid streams.

There are several methods of applying an adsorbent to a substrate. Some of these include varied processes, such as heat treatment, solvent-slurry and binder attachment. In heat treatment process, a substrate is heated to a temperature at which it softens during which time carbon is mixed with the substrate material, which is then allowed to cool. Upon cooling the adsorbent is adhered/affixed on the substrate surface. Temperatures and heating time will vary with the choice of substrate and adsorbent. The support produced by the heat treatment process creates an essentially monophasic layer of adsorbent particle, at the surface of the support (See FIG. 10). Potential disadvantage associated with the heat treatment method include (i) heat deactivation of the adsorbent or inhibition of the adsorbent's ability to function as desired; (ii) diminution of the physical properties of the substrate (iii) loss of available surface area of the adsorbent for binding since a portion of the surface is actually bound to the substrate surface and (iv) agglomeration of adsorbent particles.

A solvent/adsorbent slurry can be applied to the substrate using conventional techniques. The substrate is dipped in the slurry or spray coated with the slurry and then dried. It is important that the adsorbent be affixed firmly to the substrate in an active state after any excess slurry and solvent are removed from the support. It should be noted that although we refer to the method as "solvent slurry" the solvent merely functions as a vehicle for dispersing the adsorbent in a fluid matrix or may soften the substrate surface and/or swell the substrate. After coating the substrate with the slurry, the solvent may be evaporated and recycled. Similar to the heat treatment process, the solvent-slurry method also creates a monophasic layer of adsorbent particles on the surface of the support since the solvent is substantially removed by conventional drying techniques. Disadvantages may also accompany the solvent slurry method. These include (i) solvent deactivation of the adsorbent or inhibition of the adsorbent's ability to function as desired; (ii) diminution of the physical properties of the substrate (iii) loss of available surface area of the adsorbent for binding since a portion of the surface is actually bound to the substrate surface (iv) required selection of a substrate, adsorbent and solvent which can be applied together to work in concert and (v) disposal of spent solvent. Although the solvent slurry method can produce a substrate with active adsorbent deposited thereon, there may be some tendency for the adsorbent material to leach out from the substrate over time.

Methods of attachment which employ binders are generally of two types: a slurry method or "two-step" method. In the "two step" method, (i) a layer of binder is applied to the surface of a substrate and allowed to begin curing (ii) one or more adsorbents are added to the binder/substrate surface and (iii) the binder is then allowed to cure fully. The two-step process can be found to be commercially unappealing because of two curing steps. Therein, the present invention focusses on the application of an adsorbent material to a substrate via a simplified coating treatment. The method of this invention comprises applying a slurry coating which comprises a binder, an adsorbent and solvent to a substrate; and allowing the slurry coating to dry. The slurry method deletes any need for an intermediate drying step, permitting large batch mode preparation of the supports.

As noted, the invention is also directed to processes and apparatus used in the removal of pollutants from fluid streams. Processes employing the biologically active supports of this invention exhibit excellent performance characteristics. An important benefit which flows from this invention is that our process is resistant to upset. Resistant to upset describes the ability of the process to reduce efficiently the contaminant level of waste streams having a relatively high level of contaminants to a desired level, preventing intermittent contaminant levels in the effluent above a desired level. For example, in certain preferred embodiments of this invention, concentration levels of organic pollutants in the feed stream can be as high as about 5000 parts-per million (ppm) which through use of the process of this invention can be reduced to levels as low as 1 ppm, or 0.1 ppm or for that matter 20 parts-per-billion (ppb). This advantage is of immediate and substantial economic benefit in that it obviates the need for time consuming and expensive pretreatment processes for reducing the amount of contaminant in the aqueous stream directly exiting the manufacturing process before introducing the stream into a bioremediation process. Our process provides for continuous treatment of a waste stream such that the concentration of pollutant in the effluent stream is maintained below EPA mandated levels. In addition, since our process can remediate relatively high levels of pollutants, the likelihood of a pollutant-containing waste stream deactivating the microorganisms, killing or hindering their pollutant-degrading ability, is significantly reduced.

Another advantage of preferred embodiments of this invention is that the biologically active supports can be used in a fixed bed reactor system to reduce relatively high levels of organic pollutants in aqueous feed streams to relatively low levels with the additional benefit of significantly less sludge formation than that from currently available systems, affording important advantages in sludge disposal costs.

Another unique advantage of this invention is that significant reductions in levels of organic contaminants contained in the effluent stream can be obtained with reasonable hydraulic residence times as compared to prior art processes as for example, the process described in U.S. Pat. Nos. 4,634,672 and 4,681,851. In certain most preferred embodiments of the invention, the level of effluent phenol in a phenol-containing aqueous waste streams can be reduced to concentrations as low as 20 parts per billion at hydraulic residence times as short at 24 hours. This is also not a trivial benefit especially in view of the low levels of various organic pollutants such as phenol in aqueous waste streams from industrial processes set by the Environmental Protection Agency and the economic requirement that these reduced levels be obtained over reasonable time periods.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE EMBODIMENTS OF THE INVENTION

Figure 1:
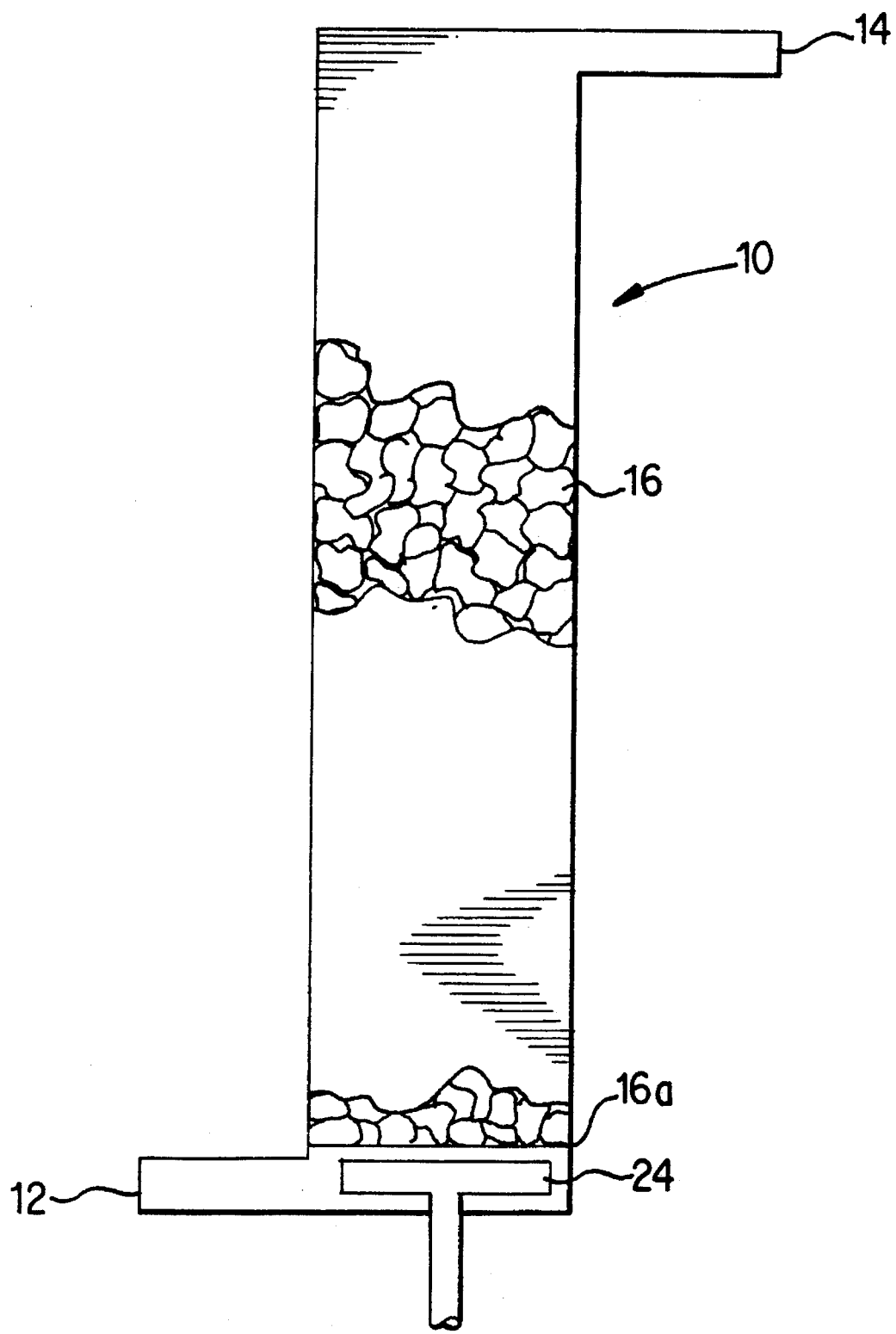
FIG. 1 is a cross-sectional side view of a vertical reactor for use in a preferred embodiments of the invention.

The embodiments of this invention establish purification processes which can significantly reduce pollutant levels in the effluent of a reactor in spite of an occasional "shock" to the biological system of a relatively high pollutant level in the influent and often maintain the effluent pollutant concentration below EPA mandated levels. "Shock" refers to a change in the concentration of pollutant in the influent stream of about 500 to 5,000 parts per million over a relatively short time (usually ranging from 1 hr up to a 1–2 days). Important to obtaining a purification process which is resistant to shock (often referred to as resistant to upset) of relatively high pollutant levels in the influent stream is the choice of biologically active support materials and components used therein. One of the main objectives of the invention is to provide a support material having an effective amount of active adsorbent on a substrate for use in a biological waste treatment reactor which achieves government mandated level of pollutant effluent and an ability to resist upset of the treatment system. The biomass supports of this invention comprise a substrate on the surface of which is firmly adhered an adsorbent. For porous supports, the adsorbent is situated on any exposed surface, including inner pores of a porous structure, such as an open-celled foam. The biomass supports are placed in a bioreactor. In a process for purification of a waste stream by biodegradation, the waste feed stream containing one or more pollutants is passed through the bioreactor, which is generally pretreated with pollutant-degrading microorganisms.

The biologically active supports of this invention comprise a support having thereon an effective amount of one or more pollutant-degrading microorganisms. Support materials are made biologically active by inoculation with microorganisms prior to use. The support comprises a substrate, having applied thereto at least in part, a coating composition comprising an effective amount of at least one adsorbent, at least one binder, an effective amount of at least one suspension aid and a solvent. The coating composition is advantageously employed to provide uniform distribution of adsorbent firmly adhered on the substrate while employing an aqueous solvent vehicle.

The selection of adsorbents, binder and solvent are as previously discussed in U.S. patent application Ser. No. 763,735 filed Sep. 23, 1991, which is incorporated herein by reference. An additional discussion is provided herein, supra.

One of the novel features of the biologically active supports of this invention is the uniform distribution of adsorbent, in an active state, on the surface of the substrate. Important to obtaining such a uniform distribution, when applying a slurry coating to a substrate, is the use of an effective suspension aid to avoid creating large agglomerations (clumping) of the adsorbent with the binder. Such agglomerations diminish and/or inhibit the diffusion of pollutants to and from the adsorbent, e.g. activated carbon. A suspension aid is employed which has a minimal inhibitory effect on the ability of the adsorbent to bind pollutants and permits forming a suspension of adsorbent in the coating composition, which when applied to the substrate affords a uniform distribution of the adsorbent on the surface of the substrate.

The suspension aid is usually a salt of an organic material. The cationic species of the salt may vary widely. For example, the cationic species can be protonated amine (i.e. an ammonium group) or an alkali metal. The suspension aid can be a zwitterionic or an anionic material. Preferably, if the suspension aid is zwitterionic, the net charge is not positive and, more preferably, the net charge is negative. The suspension aid can be a compound or polymer. Polymers can be beneficial since they possess numerous sites along the backbone for anionic groups. Any functional group which will provide anionic character (i.e. a net negative charge) to the compound of polymer may be used. Particular functional groups include sulfonates, sulfates, sulfites, phosphates, phosphites, phosphonates, carboxylates or combinations thereof. A cationic species is associated with said functional groups to form a salt. In additionally preferred embodiments, the suspension aid is a surfactant or surfactant-like material, having a net negative charge and a hydrophobic portion. Conventional surfactants and dispersing agents known in the art can be employed as suspension aids.

In further preferred embodiments of the invention, the suspension aid is in anionic surfactant material. In particularly preferred embodiments, the suspension aid is a di-anionic organic compound or polymer, which is in salt form as noted above. In alternatively preferred embodiments, the suspension aid is a polyanionic material. In preferred embodiments, the functional groups of the di-anionic or polyanionic suspension aids are carboxylates, sulfonates, sulfates, phosphates or combinations thereof. In additionally preferred embodiments, the functional groups of the dianionic or polyanionic suspension aids are sulfonates, phosphate or combinations thereof.

Compounds from which a salt can be derived to form a suspension aid are illustrated by the following formulae:

$$X-R-X \quad (1)$$

$$\begin{array}{c} X \\ | \\ (R)_n \end{array} \quad (2)$$

$$\begin{array}{c} X \\ | \\ (-R-U-)_n \end{array} \quad (3)$$

X is a functional group which provides a net negative charge to the material represented by the formula;

R is a hydrocarbon such as aromatic, heteroaromatic, cycloaliphatic, aliphatic, including hetero-containing hydrocarbons as well as a peptide or protein or polymeric form of one or the above described groups;

U is a hetero atom, wherein valences not filled by bonding with R or X are filled by H, OH, halogen, or lower alkyl or lower alkoxy (i.e. 1–8 carbons).

n is an integer from such that the number of carbons in the suspension aid is 1 to about 50. Preferably, n is an integer from about 5 to 25.

Specific suspension aids are commercial surfactants or dispersing agents, such as fatty acids salts, e.g. fatty acid sulfonates, alpha-olefin sulfonates, naphthalene sulfonates, biphenyl sulfonates as well as alcohol sulfonates or phosphate counterparts to said sulfonates. Frequently, aromatic sulfonates and phosphonates or esters thereof are employed. In other embodiments, polyanionic polypeptides, such as sodium caseinate are preferred.

Generally, the amount of suspension aid employed will vary with the concentration of binder and adsorbent in the coating composition. It is noted that if an insufficient amount of suspension aid is used, aggolermation of the adsorbent will occur; thus, negatively effecting the performance of the support formed therefrom as well as hindering the ability for commercialization of the support preparation process. It is shown in the examples that excess suspension aid can decrease the ability of the adsorbent to bind pollutant.

Preferably, an effective amount of suspension aid is employed to obtain the maximum performance of the support system. An effective amount of suspension aid is that amount which is sufficient to provide uniform distribution of adsorbent on the surface of the substrate when the coating is applied, wherein said amount does not limit significantly the binding ability of the adsorbent below the desired level in view of the potential performance of the adsorbent in the presence of the selected suspension aid.

Potential ranges for concentration of suspension aid in the coating composition vary with the amount of the other components in the coating composition. For example, an increase in the amount of water used may permit the use of less suspension aid in the coating; however, the amount of binder used may require that more suspension aid be used. The effective amount can be ascertained by creating one or more dose curves wherein the amount of suspension aid is varied with fixed amounts of the other components of the composition to look at clumping of the adsorbent on the substrate surface and inhibition of the adsorbent's ability to bind a desired pollutant.

Illustrative of useful materials for use in the fabrication of adsorbent are carbons such as coal, carbon black, activated carbon, and activated charcoal, silica gel, active clays, zeolites, hydrophobic and ion exchange resins, molecular sieves, and the like. In the preferred embodiments of the invention, adsorbent is formed from carbons such as coal, charcoal, carbon black and activated carbon, and in the particularly preferred embodiments of the invention, the particulate adsorbent is formed from activated carbon. However, it will be clear to a person skilled in the art that any other particulate material can be used to form an adsorbent may be used. The activated carbon which is preferably used may be produced by heat treatment of vegetable matter, animal matter, coal, lignite, petroleum residues or synthetic organic polymers either with or without the addition of chemicals, and is characterized by rapid and effective absorption of the targeted pollutants.

Adsorbent for use in the practice of this invention may vary widely. The adsorbent, e.g. activated carbon, once bound to the substrate should function as a solid state buffer absorbing excess pollutant within the reactor when the pollutant concentration is increased and releasing pollutant into solution when concentration decreases. The buffering effect is described by a series of on and off constants ($K_{on}$ and $K_{off}$), each reflecting the affinity of a particular site on the adsorbent for the particular pollutant. The ratio of $k_{off}/k_{on}$ equals $K_D$, which reflects the affinity of the adsorbent for a pollutant. At equilibrium, the number of molecules of pollutant that are binding to the adsorbent is equal to the number of molecules of pollutant leaving the adsorbent and entering the solution. Basically, for the process of this invention the adsorbent, once bound to the substrate or substrate and binder or binder, has a bound phase that is in sufficiently rapid equilibrium with the solution such that pollutants in solution resulting from a 1 hydraulic residence time (HRT) increase in the concentration of pollutants in the influent stream are bound within a fraction of said HRT (preferably about 1/24 HRT) after the end of said increase to maintain a desired level of pollutants in the effluent stream. The pollutant should also be released into solution at a rate sufficient to allow microbial degradation of the pollutant upon return to a concentration equal to or less than the initial concentration of pollutants in the influent ($C_1$). The desired level of pollutants in the waste stream per day or per month is usually dictated by EPA requirements. The desired level of pollutants in the effluent stream will also dictate the response time required for a treatment process to absorb an increase of pollutants in the wastestream. Generally, the response time should be at least less than about 1 HRT. In other words, if an influent stream, having pollutant concentration $C_2$ above the pollutant concentration ($c_1$) of a first influent stream, flows through a reactor for a period of 1 HRT, e.g. 24 hours, the support media should be able to absorb a substantial portion of the excess pollutant in the reactor (and, in conjunction with the degradative action of the microbes, return the pollutant concentration in the effluent to the level prior to the increase to $C_2$) within at least about 24 hours from the time of the end of the 1 HRT at the higher pollutant concentration. Preferably, the response time is less than or equal to about 1/3 HRT. More preferably, the response time is less than or equal to about 1/6 HRT. In particularly preferred embodiments, the response time is less than or equal to about 1/8 HRT. In more particularly preferred embodiments, the response time is less than about 1/12 HRT, with the most preferred being less than or equal to about 1/24 HRT.

Adsorbent is in particulate form and is preferably porous to provide for greater surface area. The preferred particulate adsorbent has a surface area at least about 500 m²/g, preferably at least about 700 m²/g, and is preferably of a size such that at least about 70% of the adsorbent particles are smaller than about 44. That is, a minimum of about 70% of the adsorbent particles pass through a 325 mesh sieve. In the preferred embodiments of the invention, powdered adsorbent has as high a pore volume as is practical, more preferably at least about 0.5 cm³/g, and most preferably at least about 0.7 cm³/g with as great a porosity as possible contributed by pores preferably of greater than about 1 micron in size. Powdered adsorbent used in the practice of the preferred embodiments of this invention have a surface area of from about 700 to about 2000 m²/g, a pore volume of from about 0.7 to about 1.0 cm³/g, with from about 70 to about 100% of the particles being under 44 microns in size. Although these correspond to characteristics of commercially available material, the invention per se imposes no such limitations and materials having as high a surface area as possible are the materials of choice.

The amount of adsorbent employed may vary widely and depends on a number of factors including the specific activity of adsorbent for the target pollutant. In the preferred embodiments of the invention, the amount of adsorbent is an amount which is at least sufficient to maintain a steady state of an amount of the target pollutant which will allow the microorganism to metabolize the pollutant in the required time period to provide an effluent stream having less than about 22 ppm of the target pollutants. In the more preferred embodiments of the invention, the amount of adsorbent is from about 5 weight percent to about 85 weight percent on a dry basis and based on the total weight of substrate, binder and adsorbent. In the particularly preferred embodiments of the invention, the amount of adsorbent is from about 10% by weight to about 50 weight percent on a dry basis and based in the total weight of substrate, binder and adsorbent. In the most preferred embodiments of the invention, the amount of adsorbent is from about 15% by weight to about 35% by weight on the aforementioned basis.

The choice of binder can vary widely. An effective binder is a material which is capable of binding an adsorbent to the surface of a substrate such that there is no or substantially no loss of adsorbent into the effluent of the bioreactor and there is no or substantially no deactivation of the adsorbent by the binder. Specifically, an effective binder is selected such that the purification process is resistant to upset. Partial coating of the support is acceptable as long as the process remains resistant to upset. The binder may be selected from any type of binder known in the art, e.g. in the particulate binding art, pigment binding art or powder binding art. Examples of binders are water-suspendable polymers such as those found in latex formulations and water-soluble polymers which can be deposited, crosslinked or polymerized into water insoluble forms such as natural gums, cellulose and starch derivatives, salts of alginic acids and polymers and copolymers of acrylic acid, acrylamide, vinyl alcohol and vinyl pyrrolidone. Examples of useful organic binders which are soluble in organic solvents include cellulose esters, cellulose ethers, polymers and copolymers of vinyl esters such as vinyl acetate, acrylic acid esters, and methacrylic acid esters, vinyl monomers such as styrene, acrylonitrile and acrylamide, and dienes such as butadiene and chloroprene; natural rubber and synthetic rubber such as styrene-butadiene.

Figure 4A:
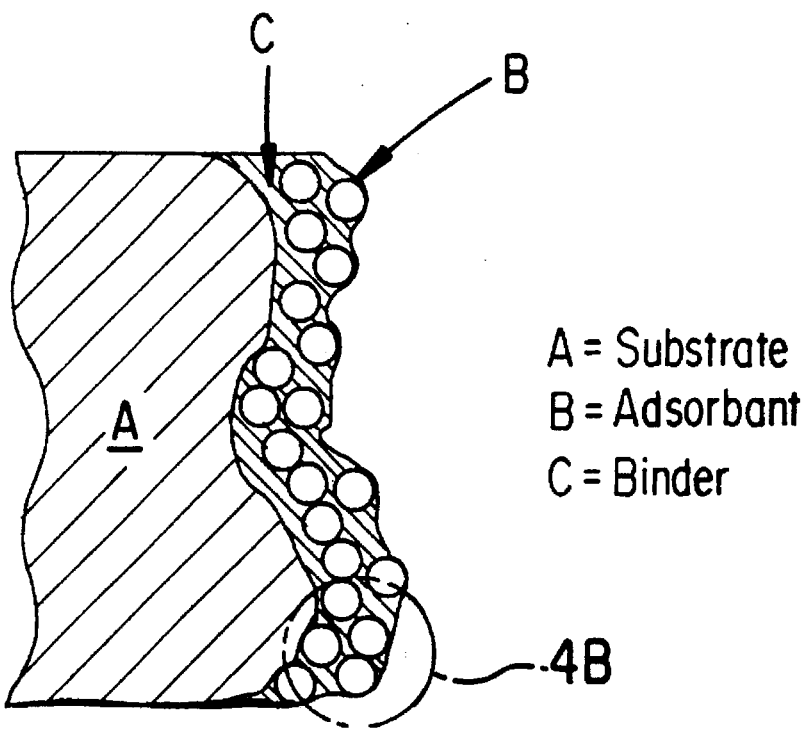
FIG. 4 is a diagram of a support having a coating layer having adsorbent dispersed in the coating.
Figure 4B:
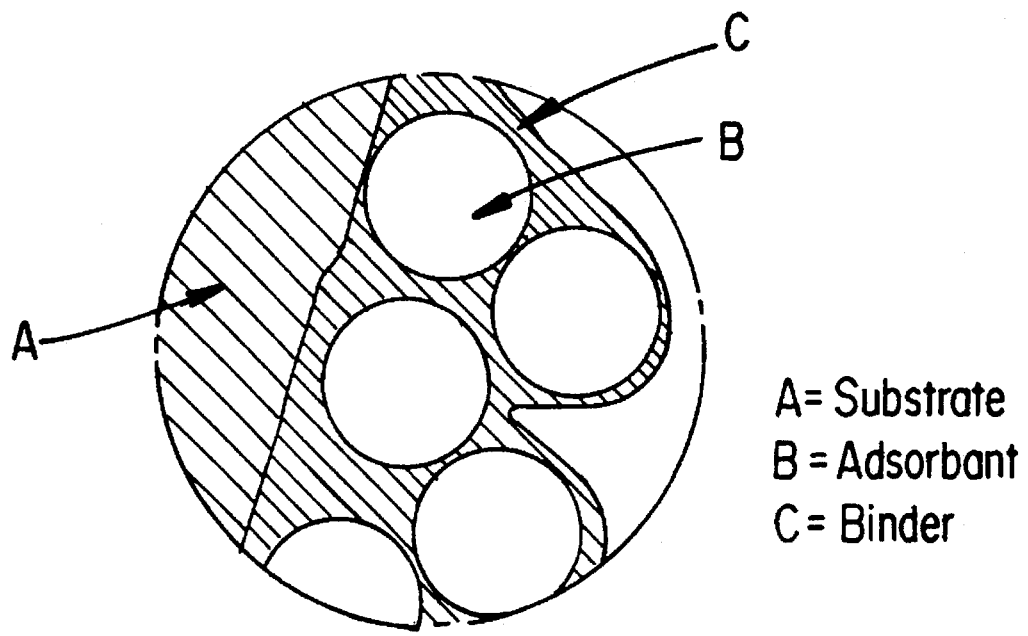

There is a tendency for binders to decrease the efficiency of an adsorbent by diminishing the adsorbent's capacity or by interfering with a pollutant's access to the adsorbent, e.g. binder envelops the adsorbent. It is theorized that disadvantages associated with an adsorbent/binder support system can be at least partially compensated by employing binders that possess a greater degree of free volume. The slurry application of binder and adsorbent creates a layer coated support of a substrate with an adsorbent dispersed in the coating layer, or in and on the coating layer (See FIG. 4). Because the slurry method produces the second matrix layer in which the adsorbent is dispersed throughout a binder, the binder may often envelop the adsorbent. Therein, the binders employed in preferred embodiments are those possessing a greater degree of free volume in order to preserve a substantial amount of the activity of the adsorbent and permit sufficient interaction of the pollutant with adsorbent such that when the support is used in a bioreactor the purification process is resistant to upset. Free volume ($v_f$) is related to the fluidity and mobility of the polymer chains and is a measure of the volume through which small molecules can migrate. Free volume is the difference between the specific volume of the polymer mass (v) and the volume of the solidly packed molecules. Basically, the free volume of the bulk polymer is the volume of the polymer mass not actually occupied by the molecules themselves.

Presently, the $T_g$, glass transition temperature, is known to be correlative to free volume (for discussion of free volume and $T_g$, see Stephen L. Rosen *Fundamental Principles of Polymeric Materials*, Chap. 8, "Transitions in Polymers", pp.89–95, 1982). Rosen theorizes that the more free volume in a polymer, the lower the $T_g$. Therein, $T_g$ is used to correlate the structure of the binder to its ability to function as an effective binder in a biomass support system. In preferred embodiments of this invention an effective binder has a $T_g$ less than or equal to about 100° C. In more preferred embodiments, the effective binder has a $T_g$ less than or equal to about 50° C. In further preferred embodiments, an effective binder has a $T_g$ less than or equal to about 30° C. In particularly preferred embodiments, an effective binder has a $T_g$ less than or equal to 20° C. In more particularly preferred embodiments, an effective binder has a $T_g$ less than or equal to about 0° C. In alternative embodiments, the preferred binder has a $T_g$ of less than or equal to about 10° C., with the binder of choice having a $T_g$ of less than or equal to about 25° C.

As previously noted, the affinity of the support for pollutants, such as phenolic materials, is related to the $T_g$. In many instances, the $T_g$ can be lowered by increasing the polarity and/or hydrophilicity of the polymer binder used in the support system. Any conventional method of increasing the hydrophilicity or polarity of a polymer can be used to improve such properties of a binder material. For example, many polymers, including homopolymers and copolymers, can be rendered more hydrophilic and/or more polar by (1) carboxylation along the polymer backbone (e.g. carboxylated styrene butadiene), carboxylation of side chains and functional groups and (3) by introducing—COOH containing monomers as comonomers in the polymer binder. Each of the above should lower the $T_g$ of polymers.

An effective binder is solvent suspendable or dispersable in that once the binder and solvent are mixed, the mixture forms a stable dispersion of binder wherein the dispersion can be applied to a substrate producing a relatively uniform coating thereon. In a preferred embodiment, the binder should be soluble in a non-aromatic solvent, if a solvent is needed, since an aromatic solvent may inactivate some adsorbents. Once the coating composition is applied and allowed to cure, the binder should be substantially water-insoluble for use in a waste stream treatment process and should not degrade in the environment of the bioreactor. The binder also should not excessively inhibit the adsorbent's ability to bind pollutants. Many commercial binders (e.g.

adhesives) are produced and sold as dispersions. In preferred embodiments, the binder is water-suspendable for application to the substrate and water-insoluble once cured on a substrate. An example of solvent-suspendable binders are what is known in the art as a latex. Generally, a latex is a solvent-suspendable form (liquid-in-liquid), which is stabilized by surface active agents.

The amount of binder used in the practice of the invention will vary with the amount and structure of the substrate as well as the amount of adsorbent to be bound. Generally, the amount should both substantially cover the substrate and bind the adsorbent. It is noted that excess binder not only can substantially decrease the actual size of inner pores of a substrate but also require additional amounts of additives for forming an adequate slurry. Furthermore, a greater thickness of binder enveloping the adsorbent will tend to inhibit or mitigate the adsorbent's pollutant binding properties. The presence of excess additives, e.g. surfactants, may deactivate an adsorbent.

The solvent used in preparing the coating composition comprises a water portion and an organic solvent portion which places the binder in a miscible or suspendable form for forming the slurry coating. Generally, the selection of solvent may vary widely. The solvent can be selected from water, organic solvents or mixtures thereof varying from 100% water to 100% organic solvent. Illustrative of organic solvents for use in the practice of this invention are as alcohols, esters, ethers, ketones, amines and nitrated or halogenated hydrocarbons. Solvents which may be used in the practice of this invention include water, alcohols, such as methanol, ethanol, propanol, isopropanol and ethylene glycol; ketones, such as acetone, methylethyl ketone, cyclohexanone and butyrolactone; as well as acetates, such as methyl acetate, ethyl acetate, propyl acetate and butyl acetate. Additional solvents include nitromethane, nitroethane, tetrachloroethane, chloroform, benzene, toluene, chlorobenzene, xylene, n-butyl chloride, cyclohexane, ethylene carbonate, propylene carbonate, dimethyl acetamide, dimethyl formamide, dimethyl sulfoxide, acetonitrile, hexamethylphosphoramide, n-methylpyrrolidone, tetrahydrofuran, diethylether, formic acid and derivatives thereof.

Preferably, the solvent employed is a non-aromatic solvent. Especially in the case of treating aromatic pollutants such as phenols, aromatic solvents tend to inhibit the amount of phenol bound by the adsorbent.

Additives can be added to the slurry to maintain the components of the slurry in a suspension during application of the slurry to a substrate. The adsorbent suspended in the slurry may have a tendency to settle out the slurry. In such cases, an additive (referred to as a "settlement retardant") to prevent such settling is advantageous. In a preferred embodiment, a settlement retardant, such as a viscosity enhancer, thickening agent or thixotropic agent, can be used to prevent the settling. In more preferred embodiments, the settlement retardant is a polysaccharide. In further preferred embodiments, the settlement retardant is an anionic polysaccharide.

Illustrative of settlement retardants for use in the practice of the invention include guar gum, carrageenan, locust bean gum, agar, algin, gum arabic, gum ghatti, gum tragacanth, karaya gum, pectin, xanthan gum, tamarind gum, psyllium seed gum, quince gum, larch gum, and cellulosic thickeners, such as carboxymethylcellulose and carboxy 2-hydroxyethyl cellulose. The cellulose thickeners are preferred. Carboxymethyl cellulose is particularly preferred.

The substrate used in the practice of this invention can vary in form. The size and shape of substrate can vary widely. For example, substrate may be in particulate form of regular shape such as tubular, rod shaped, rectangular, spherical, hexagonal or the like, or may be of irregular shape. The particle size may vary widely and is preferably at least from about 0.10 in to about 24 in. More preferred particle sizes are from about 0.2 in. to about 12 in., and most preferred particle sizes are from about 0.50 in. to about 6 in. with a particle size of from about 0.50 in. to about 3 in. being the particle size of choice.

In the preferred embodiments of the invention, the substrate is preferably an open cell material having a relatively high macroporosity, as for example a foam. This allows a pollutant-containing feed stream to flow through the interior of the substrate. In the preferred embodiments of the invention, substrate voids are at least about 0.2 millimeters, and preferably the voids range about 0.2 mm to about 5 to about 6 millimeters in size. Substrate also needs to be resistant to the shear forces and abrasion present in a fixed bed reactor, and should have good crush strength. In these preferred embodiments of the invention, substrate 18 is preferably semi-flexible, with a density of under about 2 pounds per cubic foot for optimum economic feasibility. However, higher density substrates, of from about 4 to about 5 pounds per cubic foot or even higher, are usable. It should be realized that substrate density is related to the economics of the invention and not to its performance; the invention may be practiced with a large range of substrate densities, even if certain ranges may present distinct economic advantages.

The material used to form substrate is not critical and may vary widely. The only requirements are that the material does not degrade when contacted with binder, solvent, wastestream or microorganisms; that it has a degree of affinity for the binder and/or adsorbent of choice and the substrate does not inhibit the properties of the adsorbent and/or binder.

Illustrative of useful materials for fabrication of substrate are ceramics such as bentonite, kaolinite, kieselguhr, diatomaceous earth, alumina, silica, zirconia, barium titanate, synthetic carbides, synthetic nitrides and synthetic borides and the like. Illustrative of still other materials which can be used in the fabrication of substrate 18 are glasses such as soda-lime-silica glasses, lead glasses, borosilicate glasses, laser glasses, silica glasses, and glass-ceramics.

Illustrative of still other useful substrate materials are synthetic and naturally occurring polymeric materials such as polyamides such as poly(hexamethylene adipamide) (nylon 66), poly(4-aminobutyric acid) (nylon 4), poly(6-aminohexanoic acid) (nylon 6), poly(hexamethylene sebacamide) (nylon 6,10) and the like; polyesters such as poly(ethylene terephthalate), poly(butylene terephthalate), poly(1,4-cyclohexane dimethylene terephthalate) and the like; polyolefins such as polyethylene, polypropylene, poly(4-methyl pentene), polystyrene and the like; polyvinyls such as polyvinyl alcohol, poly(vinyl methyl ether), poly(vinyl methyl ketone), poly(vinyl pyrrolidone) and the like; polyacrylics such as polyacrylic acid, polymethacrylic acid, poly(methyl acrylate) poly(methyl methacrylate) poly acrylonitrile, polyacrylamide, poly(methacrylamide) and the like. Other useful polymeric materials for use in the fabrication of the polymeric substrate are polyurethanes such as those derived from reaction of (a) diisocyanates such as toluene diisocyanates, diphenyl methane diisocyanates, hexamethylene 1,6-diisocyanate, dicyclohexylmethane diisocyanate, 1,5-naphthalene diisocyanate, p-phenylene diisocyanate, m-phenylene diisocyanate, 2,4-toluene diisocyanate, 4,4' diphenylmethane diisocyanate, 3,3'-dimethyl-4,4' diphenylmethane diisocyanate, 3,3'-dimethyl-4,4' biphenyl diisocyanate, 4,4'-diphenylisopropylidiene diisocyanate, 3,3'- dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyananodiphenylmethane and the like with (b) polyols such as glycerin, trimethyolpropane, 1,2,6-hexane triol, methyl glycoside pentaerythritol, sorbitol, sucrose, ethylene glycol, diethylene glycol, hydroxy terminated polyesters. These polyesters can be formed by direct esterification of dicarboxylic acid with an excess of a di- or polyfunctional alcohol. Examples of the acids are poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate). Polyether polyols may also be used. The polyether polyols can be prepared by reaction of a compound having active hydrogens (such as di alcohols, poly alcohols, di phenols, polyphenols, aliphatic diamines or polyamines and aromatic diamines or polyamines) with alkylene oxides such as styrene oxide, butylene oxide, propylene oxide, epichlorohydrin or mixtures of these alkylene oxides.

In the preferred embodiments of this invention, substrate is formed from open-celled polyurethanes, such as cross-linked polymeric materials which can be foamed with an appropriate foaming agent such as nitrogen, helium, carbon-dioxide, azodicarbonamide and the like, to form open celled foams having the void characteristics described above. In these preferred embodiments of the invention, substrate 18 can be prepared and foamed in the presence of the selected microorganism without adversely affecting same.

In the particularly preferred embodiments of the invention, substrate is formed from open-celled polyurethanes such as cross-linked poly-urethane-hydrogels. Such materials can be obtained from commercial sources or prepared in accordance with known techniques. For example, such materials may be obtained by reacting isocyanate prepolymers with water (in which diamines or polyamines are optionally contained as chain lengthening agents), or as cross-linking agents or by reacting a suitable polyol with a suitable diisocyanate or polycyanate reagent. Suitable polyols include long chain aliphatic diols and polyoxyalkylene ethers. The isocyanate prepolymers have isocyanate endgroups and are prepared by reacting poly oxyalkylene ethers with an excess of diisocyanate or polyisocyanates. Illustrative of useful polyoxyalkylene ethers are those which have a molecular weight of from about 500 to about 10,000, preferably from about 2,000 to about 8,000, which have at least two active hydrogens and which contain at least 30% by weight based on the total weight of the polyethers of oxyethylene groups. Other useful oxyalkylene groups include oxypropylene, oxybutylene and the like. Polyethers of this type are produced by reacting compounds which have reactive hydrogen atoms such as dialcohols, polyalcohols, diphenols, polyphenols, aliphatic diamines, aliphatic polyamines, aromatic diamines, or aromatic polyamines with a suitable alkylene oxide such as ethylene oxide, propylene oxide, butylene oxide, styrene oxide and the like. Suitable diisocyanates include toluene 4,4'-diisocyanate, toluene 2,4-diisocyanate, toluene 2,2-diisocyanate, diphenylmethane 4,4'-diisocyanate, diphenylmethane 2,4'-diisocyanate, diphenylmethane 2,2'-diisocyanate, toluene 2,6-diisocyanate, hexamethylene 1,6-diisocyanate and useful diamines and polyamines include aliphatic, cycloaliphatic and aromatic di- and polyamines such as ethylene diamine, hexamethylene diamine, diethylene triamine, hydrazine, guanidine, carbonate, N,N'-diisopropylhexamethylene diamine, 1,3-bisaminomethylbenzene, N,N'-bis-(2-aminopropyl)ethylene diamine, N,N'-(2-aminoethyl) ethylene diamine, 4,4'-diaminodiphenyl methane, 4,4'-dimethylamino-3,3-dimethyldiphenyl methane, 2,4'-diamino-diphenylmethane, 2,4-diaminotoluene, 2,6-diaminotoluene and the like.

The amount of substrate (as measured in the absence of any microorganisms) used in the supports may vary widely. In general, the amount of substrate is from about 10 to about 70 weight percent based on that total weight of biologically article support. In the preferred embodiments of the invention, the amount of substrate is from about 20 to about 60 weight percent based on the total weight of support, and in the particularly preferred embodiments is from about 30 to about 50 weight percent on the aforementioned basis.

The most preferred polymeric substrate material in the present invention is a flexible open-celled foam with a high permeability to water. The foam used in the practice of this invention must accommodate feed flow in a reactor. To this end, it is important that the foam has a highly interconnected porosity where the foam voids desirably are at least about 0.2 millimeters and can range up to about 10 millimeters or more in size.

Biologically active supports may include various optional ingredients. Illustrative of other optional components which can be used in the practice of this invention are density-increasing substances such as barite, metal powder, powdered rubber, clay powder, pumice powder, glass powder, powder obtained from the kernels and shells of olives and nuts, and rock-flour; density-reducing substrates such as small polystyrene globules, wood powder, powder from plastic waste, hollow microbeads, and polyethylene foam flakes; coloring agents such as coloring pigments, and dyes; short fibers of an organic or inorganic base such as glass fibers and gel-forming macromolecular substances such as types of cellulose, alginates, starch, and carrageenans.

Following attachment of adsorbent to the support, the biomass support so produced is then cut, as needed, into an appropriate size and loaded into a reactor. Alternatively, the coating of the substrate can be performed on pieces of the size to be used in the bioreactor. A suspension of pollutant degrading microbes is then added to the reactor. The biodegradative microbes absorb and attach on, in or on and in the porous supports through natural processes well known in the art.

It is theorized that the ability of a support to produce the process of this invention, said process being resistant to upset as discussed above, is related to the alpha value for the particular support. An alpha value is calculated based on the formula below:

$$\text{alpha value} = \frac{\frac{[\text{g pollutant removed from solution}]}{[\text{g support}]}}{\frac{[\text{g pollutant remaining in solution}]}{[\text{g solvent in which pollutant is carried}]}}$$

The alpha value reflects the ability of the support (per gm) to remove pollutant from solution. The alpha value is measured using a set quantity of a particular pollutant in water or other solvent for the pollutant (100 ppm pollutant in 100 mL solution) and measuring the initial pollutant concentration and the final pollutant concentration after the support is placed in the solution for a set time, usually about 24 hours. The pollutant concentration in solution at the end of the 24 hours is measured to obtain an alpha value for the support. For the process of this invention, the support used should have an alpha value (per gram of support, said support comprising a substrate, an adsorbent and optionally, a binder) of at least about 100. Preferably, the alpha value for the support is at least about 200. More preferably, the alpha value is at least about 400. In further preferred embodiments, the alpha value is at least about 600. In particularly preferred embodiments, the alpha value is at least about 1,000. In more particularly preferred embodiments, the alpha value is at least about 1500. In alternative embodiments, the alpha value is at least about 2,000, with the alpha value of choice being greater than about 3,000.

Microorganisms, used in the practice of this invention, are anaerobic and aerobic microorganisms selected to degrade target pollutants in ways well known in the art. The microorganisms can be employed as a pure strain or as a consortium of microorganisms. In preferred embodiments of the invention, aerobic microorganisms are employed. Although anaerobic microorganisms often degrade pollutant materials at a slower rate than aerobic microorganism, an anaerobic process may be required to degrade a pollutant or an intermediate product to a material which is susceptible to aerobic degradation to a non-toxic level or to a non-pollutant material. For example, ammonia can be remediated anaerobically first and then aerobically to the final products. Useful microorganisms may vary widely and may be naturally occurring microorganisms or may be genetically engineered microorganisms. The only requirement is that microorganisms are capable of metabolizing the target pollutant(s) to the required effluent levels over the required period of time. In the preferred embodiments of the invention, microorganisms are obtained from the pollutant-containing waste stream or from soil which has been in contact with the waste stream.

In the operation of the process, the cell content of microorganisms (including extracellular proteins produced by microorganisms) is an amount which is sufficient to reduce the organic pollutant content to the desired concentration level within the desired hydraulic retention time. In the preferred embodiments of the invention, cell content of microorganisms is at least about 0.3% by weight based on the total weight of microorganisms, substrate, binder and adsorbent, and in the most preferred embodiments of the invention is from about 0.3% by weight to about 15% by weight based on the aforementioned basis. Among these particularly preferred embodiments most preferred are those embodiments in which the cell content of microorganisms 22 is from about 0.5 to about 10% by weight based on the total weight of adsorbent, microorganisms and substrate, with a content of from about 0.8 to about 5% by weight on the aforementioned basis being the amount of choice.

Figure 2:
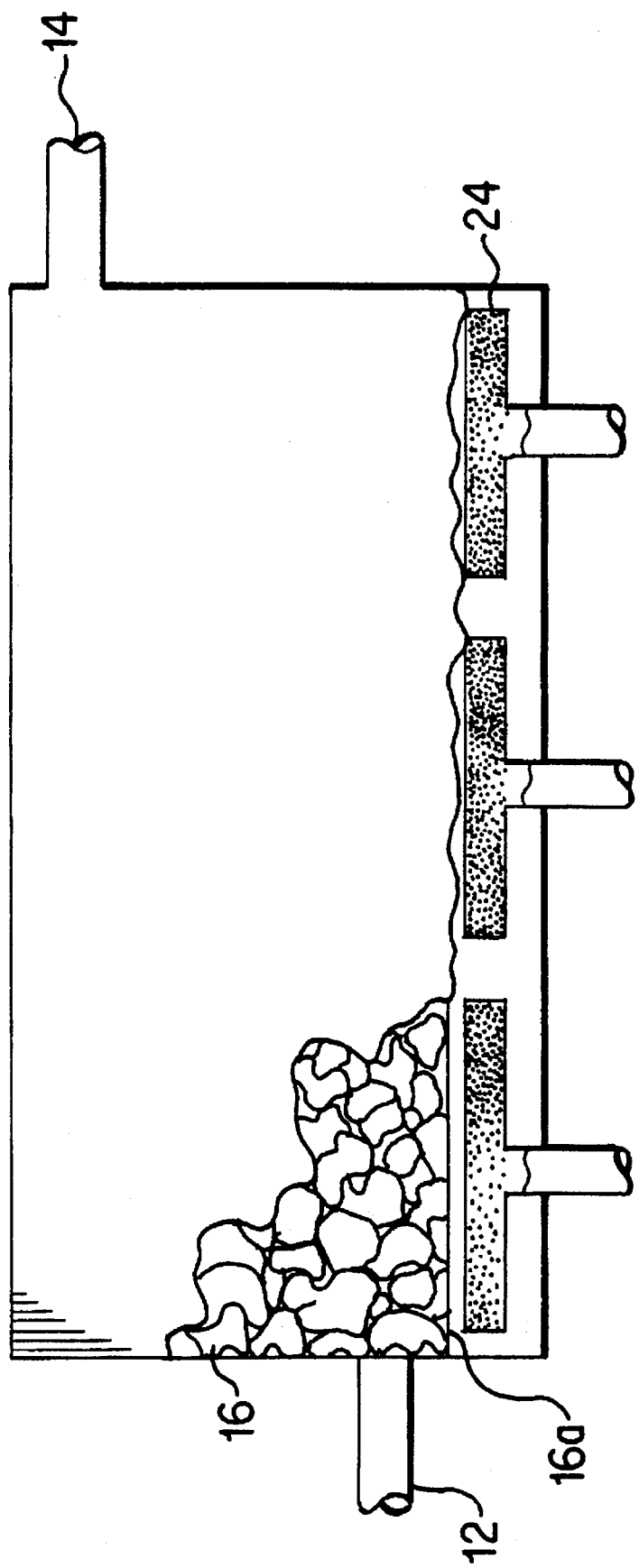
FIG. 2 is a cross-sectional side view of a horizontal reactor for use in the process of this invention.
Figure 3:
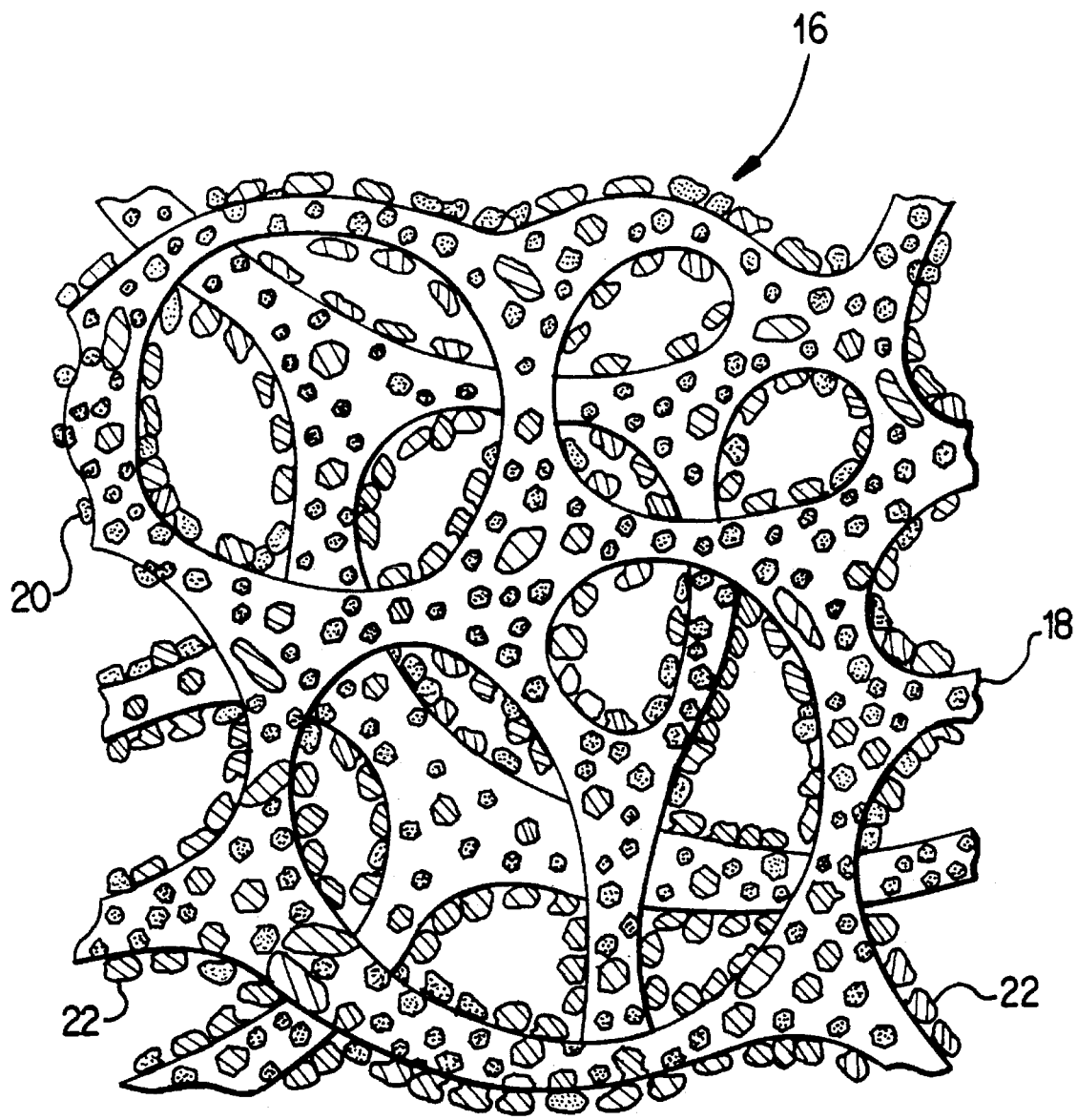
FIG. 3 is a cross-sectional view of a preferred biologically active particle for use in the process of this invention.

Many aspects of the present invention will be better understood by those of skill in the art by reference to the figures. Referring to FIGS. 1 and 2, the numeral 10 indicates a reactor for use in the process of this invention. In the process, an aqueous waste stream containing one or more pollutants is introduced into reactor 10 via inlet 12, passes through reactor 10 (and exits the reactor via exit 14) in the presence of a gas comprising an effective amount of oxygen at a rate sufficient to reduce the concentration of at least one of the pollutants in the effluent stream to the desired levels. Reactor 10 contains a plurality of biologically active support materials as identified in FIGS. 1 and 2 by the numeral 16. As depicted in FIG. 3, biologically active support materials 16 comprise a support 18, having one or more types of a particulate adsorbents 20 for at least one of the pollutants contained in said aqueous stream on the surface of substrate 18 in the micropores of substrate 18 or on the surface of support 18 and in the micropores of substrate 18. Biologically active support materials 16 also include one or more types of microorganism 22 on, in or on and in substrate 18 and/or adsorbent 20 which are capable of metabolizing at least one of the materials contained in the waste stream. Although a biological treatment can be carried out using aerobic or anaerobic microorganisms, aerobic processes are preferred since aerobic systems work at a faster rate than anaerobic. The process is carried out in the presence of a gas comprising an effective amount of oxygen. As used herein, an "effective amount of oxygen" is an amount of oxygen which is sufficient to supply the metabolic requirement oxygen for the micro-organisms metabolizing the target pollutant. It is important that reactor 10 be oxygenated to provide the necessary amount of oxygen for proper microbial metabolism and pollutant degradation. The amount of oxygen required in any situation will vary widely and will depend to a significant extent on the requirements of the particular microorganism(s) employed in the process and other factors known to those of skill in the art. In general, the amount of oxygen distributed in the process feed stream is at least about 2 mg of oxygen per liter of aqueous feed. In the preferred embodiments of the invention, the amount of oxygen is from about 2 mg/L of feed to about 10 mg/L of feed, and in the most preferred embodiments of the invention, the amount of the oxygen is from about 6 mg/L of feed to about 8 mg/L of feed. In the preferred embodiments of this invention, the gas is distributed uniformly or substantially uniformly throughout all or a portion of the biologically active biomass. The manner in which the gas is introduced into reactor 10 may vary widely. The gas may be introduced into reactor 10 employing conventional methods. For example, in the vertical or up-flow reactor 10 of FIG. 1, the gas is introduced into reactor 10 with the aqueous feed stream at the bottom of the reactor 10 through use of sparger 24 which introduces the gas in the form of small diameter gas bubbles. Supplemental gas can be introduced, if required, at various points along the vertical length of reactor 10 (not depicted in the drawing). In a embodiment of the invention in which reactor 10 is a horizontal reactor, as for example the reactor of FIG. 2, the gas can be introduced along the horizontal length of reactor 10 at various points to achieve a substantially uniform distribution of the gas in the feed stream in reactor 10. In this embodiment, the up-flow of the gas is orthogonal or substantially orthogonal to the direction of the flow of the aqueous feed stream. In the most preferred embodiments of the invention, reactor 10 is in a horizontal configuration in which the gas is distributed uniformly or substantially uniformly throughout all or substantially all of reactor 10. In these most preferred embodiments, the gas is introduced into reactor 10 along the horizontal length of reactor 10 as depicted in FIG. 2. In this mode, a more uniform distribution of the gas in the feed stream is achieved.

Process temperatures may vary widely and will depend on the particular microorganisms chosen for use. In general, the process is carried out at a temperature sufficiently high so as to not unduly interfere with the metabolism of the microorganism and sufficiently low as not to promote heat inactivation of the microorganism. Process temperatures are usually from about 5° C. to about 65° C. Process temperatures are preferably in the range of from about 15° C. to about 65° C., more preferably in the range of from about 12° C. to about 45° C. and most preferably in the range of from about 25° C. to about 35° C.

The aqueous pollutant-containing stream is treated in the process of this invention for a time sufficient to reduce concentration levels of at least one pollutant in the effluent stream the desired extent. In general, with aqueous feed streams in which the concentration levels of at least one pollutant is equal to or less than about 5000 ppm a hydraulic residence time of less than about 48 hours, preferably less than about 24 hours, and more preferably less than about 15 hours, suffices to reduce the concentration of at least one pollutant in the effluent stream to a concentration equal to or less than about 22 parts per million (ppm), preferably equal to or less than about 10 ppm, more preferably equal to or less than about 1 ppm and most preferably equal to or less than about 0.1 ppm, with a concentration of equal to or less than about 0.02 ppm being the concentration of choice. The particular hydraulic residence time depends upon the amount of pollutant material in the feedstock, operating temperature, the presence of other materials in the feedstock, the density of microorganisms in the fixed bed, and so forth.

The aqueous waste streams which may be treated using reactors containing the biomass supports of this invention and the pollutants contained in such streams may vary widely. Waste streams containing inorganic (e.g. ammonia) or organic materials can be treated. The organic materials include a vast number of hydrocarbons and modified hydrocarbons, such as aliphatics, aromatics, heteroaromatics and halogenated derivatives thereof. Additional organic pollutants include hydrocarbons which contain functional groups, for example, a hydroxy, aldehyde, carboxylic acid, cyano phospho, and sulfur-containing groups ($-SO_3H$, $-SO_4$, $-S-$, SH, and $-SR$ wherein R is a monovalent hydrocarbon). One of the major classes of organic pollutants consists of aromatic hydrocarbons, such as benzene, toluene, xylenes, alkylbenzenes, phenolic materials and halogenated derivatives thereof as well as polynuclear aromatic hydrocarbons such as naphthalene, anthracene, chrysene, acenaphthylene, acenaphthene, phenanthrene, fluorene, fluoranthene, naphthacene, pyrene and halogenated derivatives thereof (e.g. polychlorinated biphenyls, hexachlorobenzene, 5-bromouracil, 2,4-dichlorophenol and so forth). In the preferred embodiments of this invention, the pollutants are those which are common in waste streams from industrial manufacturing facilities. For example, phenolic materials are preferred pollutants for treatment in the process of this invention. Illustrative of phenolic materials are phenol, cresols, resorcinols, catechol, halogenated phenols as for example, 2-chlorophenol, 3-chlorophenol, 4-chlorophenol, 2,4-dichlorophenol, pentachlorophenol, nitrophenols such as 2-nitrophenol and 4-nitrophenol, and 2,4-dimethyl-phenol. Phenolic materials are found in waste streams of phenol manufacturers, of phenol users, of phenol resin producers, of coal tar processing facilities, and of wood pulping plants and other facilities practicing delignification. This is not to say that the process can or must be practiced only on such streams. The process which is the invention herein may be practiced on any aqueous feed containing levels of organic pollutants which are to be reduced. Preferably, the pollutants in the waste streams treated are non-particulate matter.

The initial concentration of pollutants contained in the aqueous waste stream used in the process of this invention may vary widely. One of the advantages of this invention relative to prior art bioremediation processes is that waste streams containing relatively high amounts of pollutants can be treated. The concentration of organic pollutants in process streams treatable in the process of this invention are "biologically treatable levels". As used herein, "biologically treatable levels" are pollutant concentrations which do not inhibit or excessively inhibit the metabolism of the pollutants by the microorganism. Effluent streams from industrial processes such as phenol manufacturing plants and coal tar processing plants may have pollutant levels in excess of 20,000 ppm which may interfere with the process. It is preferred to reduce these levels to biologically treatable levels through use of conventional procedures such as solvent extraction, steam distillation and the like. In general, the concentration of pollutants in the aqueous streams is equal to or less than about 5000 ppm. Obviously, the lower concentration is not critical and does not represent a limitation on the process. In the preferred embodiments of this invention, the concentration of organic pollutants is equal to or less than about 4000 ppm, and in the particularly preferred embodiments of the invention the concentration of pollutants is equal to or less than about 3000 ppm. Amongst these particularly preferred embodiments of the invention, most preferred are those in which the concentration of pollutants is equal to or less than about 2000 ppm with a pollutant concentration of equal to or less than about 800 ppm being the concentration level of choice. Obviously, with a longer hydraulic retention time, greater concentrations of pollutants can be biologically treated.

The pH of the pollutant-containing feed may need to be adjusted for optimum biodegradation. In general, the pH is within the pH range allowing metabolism of the target pollutant(s). In the preferred embodiments of the invention, the pH of the feed is from about 6 to about 9, and in the most preferred embodiment of the invention, the pH of the feed is from about 6.5 to about 7.5.

Nutrients may need to be provided. Such materials may be added through use of known additives such as fish meal peptone, soybean flour, peanut oil, cotton seed oil, and the like, and usually salts capable of providing phosphate, sodium, potassium, ammonium, calcium, sulfate, chloride, bromide, nitrate, carbonate or like ions may be required. Trace elements known to those skilled in the art may be added as required. Usually sufficient amounts often are present in the aqueous feed to satisfy minimum requirements of the microorganism.

The aqueous feed stream is introduced into reactor 10 employing conventional means and is passed through reactor 10 employing an "effective hydraulic retention time". As used herein, an "effective hydraulic retention time" is a time which is sufficient for the process to reduce the concentration of pollutants in the effluent stream to the desired levels. Hydraulic retention times may vary widely and in general depend on such factors as the concentration of pollutants in the aqueous feed stream, desired maximum concentration of pollutants in the aqueous effluent stream, the microorganisms contained in the biomass, the pollutant, and the like. An advantage of the process of this invention is that reductions in pollutant concentration can be obtained with relatively short hydraulic retention times. In the preferred embodiments of this invention hydraulic retention times are equal to or less than about 48 hrs, and in the particularly preferred embodiments of the invention such times are from about 10 to about 36 hrs. Amongst these particularly preferred embodiments of the invention, most preferred are those embodiments in which the hydraulic retention time is from about 10 to about 24 hrs.

As noted, one advantage of the process of this invention is that the process is resistant to upset by relatively high concentrations of pollutant(s) in the influent stream. When the concentration of a pollutant in an influent stream is increased from a first concentration, $C_1$, to a second higher concentration, $C_2$, for a period of 1 HRT, the increase to $C_2$ causes an increase in the concentration of the effluent stream. In our process the concentration of said pollutant in the effluent stream is reduced to less than about 0.15 $C_2$ within about 1/24 HRT or less after the end of flowing through a reactor an influent stream at concentration $C_2$ for said 1 HRT. In addition, the process provides that upon decreasing the concentration of pollutant in the influent to $C_1$ and maintaining the concentration of pollutant at or about the $C_1$ level for at least one HRT, the concentration of pollutant in the effluent stream decreases to less than or equal to about 0.12 $C_1$ within about 1 HRT or less. For example, when there is a two-fold increase in the pollutant concentration from $C_1$ to $C_2$, wherein $C_1$ is a pollutant concentration level less than the level at which microorganisms are inhibited, the treatment process is able to reduce the pollutant concentration in the effluent stream at less than 0.15 $C_2$ within 1/24 of the selected HRT for the process. Preferably, the process can reduce the pollutant concentration to such levels when $C_2$ is a concentration at which the microorganisms would otherwise be at least partially inhibited.

In additional embodiments of this invention, the purification process is such that the concentration of pollutant in the effluent stream in response to an increase of pollutant concentration in the influent from $C_1$ to $C_2$ for 1 HRT is reduced to less than or equal to about 0,075 $C_2$ within about 1/24 HRT at the end of said 1 HRT at $C_2$ and upon returning the influent pollutant level to $C_1$ and maintaining at $C_1$ for at least 1 HRT, the concentration of pollutant in the effluent decreases to less than or equal to about 0.001 $C_1$ within about 1 HRT or less.

More preferably, in the purification process of this invention, the concentration of pollutant in the effluent stream, in response to an increase of pollutant concentration in the influent stream from $C_1$ to $C_2$ for 1 HRT, is reduced to less than or equal to about 0.01 $C_2$ within about 1/24 HRT at the end of said HRT at $C_2$ and upon decreasing influent pollutant level from $C_2$ back to $C_1$, and maintaining at $C_1$ for at least 1 HRT, the concentration of pollutant in the effluent stream decreases to less than or equal to about 0.001 $C_1$ within about 1 HRT or less.

In further preferred embodiments of the purification process of this invention, the concentration of pollutant in the effluent stream in response to an increase of pollutant concentration in the influent from $C_1$ to $C_2$ for 1 HRT is reduced to less than or equal to about 0,005 of $C_2$ within about 1/24 HRT or less at the end of said HRT at $C_2$ and upon decreasing the influent pollutant level from $C_2$ back to $C_1$ and maintaining the concentration of pollutant at or about $C_1$ for at least 1 HRT, the concentration of pollutant in the effluent stream decreases to less than or equal to about 0.0005 $C_1$ within 1 HRT or less.

The novel biomass supports of this invention can be used in conventional biological waste treatment systems, such as continuous stirred reactors, fixed-bed reactors and fluidized-bed reactors. Preferably, a fixed-bed reactor system is employed in the practice of this invention to provide a treatment process with low sludge production. Conventional fixed-bed systems are described in U.S. Pat. No. 4,983,299 to Lupton et al. which is incorporated herein by reference.

The following examples are merely illustrative and representative of our invention which is of considerably larger scope. These examples should not be considered limiting in any way.

EXAMPLES

Example 1

Purpose of experiment:

To demonstrate the problem of clotting of PAC when the PAC is not pretreated, or pretreated with insufficient amount of surfactant, suspended in a latex adhesive, coated onto a PUF surface and cured by air drying. The adhesive used, Synthemul 40404-00 is in the form of an anionic surfactant-stabilized carboxylated acrylic copolymer. It is available from Reichold Chemicals, Inc. The Dowfax 2A1 is an anionic surfactant composed of dodecyl (sulfophenoxy) benzenesulfonic acid and oxybis (dodecylbenzenesulfonic acid), both disodium salts. The Dowfax materials are available from Dow Chemical. The PAC type C was obtained from Calgon Corp.

A slurry prepared by adding 5.4 g PAC to 14.4 mL water and 1 mL Dowfax 2A1 (stirring rapidly), followed by 9.6 mL Synthemul latex adhesive, was quite clotted. The clumps could not be suspended. Attempted coating onto a 1"×1"×1" cube of 13000 series General foam resulted in poor penetration of the PUF cells. Large (1–3 mm; some even larger) lumps of congealed PAC were present on the surface. Raising the amount of water to 19.2 mL and lowering the amount of adhesive to 4.8 mL did not improve the slurry. Please refer to experiments 2 and 3 in Table 1. When surfactant was omitted, clotting of the PAC was of equal or greater severity.

Example 2

Purpose of experiment:

To demonstrate ability of appropriate concentration of surfactant (Dowfax 2A1) to prevent clotting of PAC. The concentration of surfactant was determined by experiment as being close to the minimum concentration necessary to prevent clotting of the PAC upon adding the adhesive to the surfactant-treated PAC. The criteria were visual inspection of the suspension (no discrete particles were visible to the naked eye; the suspension was a dark charcoal gray) as well as the final adhesive bound PAC-PUF composite (occasional lumps no larger than 0.2 mm present; ideally no lumps visible to naked eye). As can be seen in Table 1, ratios of g PAC/mL surfactant of 2.7 and 3.2 (runs 4, 5 and 1) yield unclotted suspensions and good, smooth coatings of the PUF. A ratio of 5.4 (runs 2 and 3) yields clotting of the PAC.

TABLE 1

Effect of Constituents on PAC Clotting

| | mL H$_2$O | mL Adh | g PAC | mL Surf | Appearance of Suspension | Degree of clotting on PUF |
|---|---|---|---|---|---|---|
| 1 | 14.4 | 9.6 | 3.2 | 1 | Nice | — |
| 2 | 14.4 | 9.6 | 5.4 | 1 | Clotted | +++ |
| 3 | 19.2 | 4.8 | 5.4 | 1 | Clotted | +++ |
| 4 | 14.4 | 9.6 | 5.4 | 2 | Nice | — |
| 5 | 19.2 | 4.8 | 5.4 | 2 | Nice | — |

Adh = Adhesive
Surf = Surfactant, Dowfax 2A1

Example 3

Purpose of experiment:

To demonstrate inhibition of ability of phenol to be removed from solution by PAC when the PAC is pretreated with Tween surfactant prior to suspension in a latex adhesive, coated onto a PUF surface and cured by air drying. This series of experiments demonstrate that Tween 80, a nonionic surfactant, allows PAC to be suspended in Synthemul adhesive without clotting or clumping but inhibits its ability to bind phenol. In these experiments, 3"×1.5"×1" slabs of GENERAL FOAM, 13000 series polyurethane foam (PUF), were treated with various PAC suspensions, the excess slurry removed with rollers and the composite air cured at room temperature for two days.

Table 2 contains, from left to right, sample number, an abbreviated summary of how the different samples were prepared (the sequence of addition of reagents, as written from left to right), the observations of the condition of the slurry and final composite (the observed degree of clumping of the PAC suspension, and the observed degree of clumping of PAC on the foam surface in the final, cured composite) the final concentration of phenol after the binding assay (the initial phenol concentration used in the phenol binding assay of the samples was 94.1 ppm), the weight of composite used in the assay, and the alpha value calculated from these numbers.

The preparation of suspensions for treating the individual PUF slabs and observations of the suspensions and final composites are as follows:

1. No added surfactant was employed in the preparation of this suspension. To 30 mL of rapidly stirring water was added 30 mL Synthemul over a one minute period, followed by 11.6 g PAC. Severe clumping of the PAC resulted. Conclusion: Level of aggregation of the PAC unacceptable.
2. No added surfactant was employed in the preparation of this suspension. To 30 mL of rapidly stirring water was added 11.6 g PAC followed by 30 mL Synthemul. NOTE This sequence of additions is the reverse of sample 1. Not much clumping was obvious in the suspension but when the PUF was treated much clumping was apparent on the PUF surface. Conclusion: Level of aggregation unacceptable.
3. Surfactant was employed in the preparation of this and all subsequent suspensions. To 36 mL of rapidly stirring water was added 4.2 g PAC, followed by 0.9 mL Tween 80. After stirring for 5 min. to allow dissolution of the Tween and wetting of the PAC, 24 mL of Synthemul was added. The suspension was unclotted. There was no clumping on the foam. Conclusion: Level of aggregation acceptable but note low Alpha value.
4. In this sample we tried increasing the amount of PAC. To 36 mL of rapidly stirring water was added 10 g PAC, followed by 2.0 mL Tween 80. After stirring for 5 min. to allow dissolution of the Tween and wetting of the PAC, 24 mL of Synthemul was added. Severe clumping of the PAC resulted, in the suspension as well as on the foam. Conclusion: Level of aggregation unacceptable. The Alpha value was a bit higher.
5. In this sample we lowered the amount of PAC added to 7 g, a value between that used in samples 3 and 4. No clumping was evident, but Alpha values were quite low.
6, 7 and 8. In these runs we added the Synthemul quickly, otherwise the samples were prepared in a fashion similar to 4. In these experiments we wanted to find the upper limit of PAC that could be added before it clumped. In number 6, 10 g of added PAC resulted in clotting, in number 7, 9 g resulted in clotting, but not as much, and in number 8, 8 g looked just fine. However the Alpha values also dropped in the same order.

The overall conclusion from this set of experiments is that a non-ionic surfactant works well at maintaining a suspension of PAC in a carboxylated polyacrylate adhesive latex, yet acts to inhibit the phenol binding properties of the PAC.

TABLE 2

Inhibition of Phenol Binding by Tween 80 Treatment of PAC.

| | Protocol | Appearance of Suspension | Degree of clotting on PUF | Final Phenol Conc., ppm | Grams composite | Alpha Value |
|---|---|---|---|---|---|---|
| 1 | 30 mL H$_2$O + 30 mL Adh/ 11.6 g PAC | Clotted | + | 7.376 | 0.8862 | 1327 |
| 2 | 30 mL H$_2$O + 11.6 g PAC/ 30 mL Adh | Slightly Clotted | + | 1.485 | 1.3393 | 4656 |
| 3 | 36 mL H$_2$O + 4.2 g PAC + 0.9 mL Tween/ 24 mL Adh | Good | − | 16.82 | 1.1742 | 391 |
| 4 | 36 mL H$_2$O + 10 g PAC + 2 mL Tween/ 24 mL Adh (S) | Clotted | +++ | 3.403 | 1.7978 | 1483 |
| 5 | 36 mL H$_2$O + 7 g PAC + 2 mL Tween/ 24 mL Adh | Good | − | 18.31 | 1.3792 | 300 |
| 6 | 36 mL H$_2$O + 10 g PAC + 2 mL Tween/ 24 mL Adh (F) | Good | +++ | 2.549 | 2.4499 | 1466 |
| 7 | 36 mL H$_2$O + 9 g PAC + 2.5 mL Tween/ 24 mL Adh (F) | Good | ++ | 5.633 | 2.0386 | 770 |
| 8 | 36 mL H$_2$O + 8 g PAC + 2.5 mL Tween/ 24 mL Adh (F) | Good | − | 20.75 | 1.1389 | 310 |

Adh = Adhesive, Synthemul; Initial phenol concentration = 94.1 ppm; (S) = Slow addition of Synthemul; (F) = Fast addition.

Example 4

Purpose of experiment:

To further demonstrate inhibition of ability of phenol to be removed from solution by PAC when the PAC is pretreated with Tween 80 surfactant prior to suspension in a latex adhesive, coated onto a PUF surface and cured by air drying. The difference from Example 3 is the order of addition of Tween and PAC.

TABLE 3

Inhibition of Phenol Binding by Tween 80 Treatment of PAC. 2.5 mL Tween 80 dissolved in 36 mL $H_2O$, then 8 g PAC added, then 24 mL Synthemul.

| | Surf | Observations of Preparation | | Final Phenol Conc., ppm | Grams composite | Alpha Value |
|---|---|---|---|---|---|---|
| | | Appearance of Suspension | Degree of clotting on PUF | | | |
| 1a | − | Severe clotting | +++ | 2.68 | 1.7255 | 2198 |
| 1b | − | Severe clotting | +++ | 1.22 | 1.5531 | 5440 |
| 2a | + | Good suspension | − | 5.69 | 2.0709 | 837 |
| 2b | + | Good suspension | − | 5.90 | 2.6730 | 624 |

Adh = Adhesive
Surf = Surfactant, Tween 80
Initial phenol concentration = 104.3 ppm The conclusions drawn are identical to those mentioned in example 3 above, that a non-ionic surfactant works well at maintaining a suspension of PAC in a carboxylated polyacrylate adhesive latex, yet acts to inhibit the phenol binding properties of the PAC.

Example 5

Purpose of experiment:

To demonstrate the general nature of inhibition of PAC binding of phenol when the PAC is pretreated with a non-ionic surfactant. This series of experiments extends the conclusion that non-ionic surfactants are inhibitory towards phenol binding. They demonstrate that Igepal CA-897, another non-ionic surfactant, acts to keep PAC in suspension but inhibits its ability to bind phenol. In this regard it is similar to the Tween 80.

The experiments were run as four sets. The "a" experiment in each set used 13000 series General Foam as the substratum while the "b" experiment used Scott Blue Foamex. In all of these experiments, PAC was added to rapidly stirring water followed by surfactant, then the adhesive and finally the PUF substratum. Prior to the experiments described in the table, we determined the approximate minimum amount of surfactant required to maintain an un-clumped suspension for the amount of PAC utilized. As can be seen in the table, all three formulations of water, PAC, surfactant and Synthemul adhesive (using either General Foam or Foamex as substratum) yielded low activity composites. As was concluded in the previous experiment (#3), the overall conclusion from this set of experiments is that a non-ionic surfactant works well at maintaining a suspension of PAC in the carboxylated polyacrylate adhesive latex, yet acts to inhibit the phenol binding properties of the PAC.

TABLE 4

Inhibition of Phenol Binding by Igepal Treatment of PAC.

| | Protocol | Observations of Preparation | | Final Phenol Conc., ppm | Grams composite | Alpha Value |
|---|---|---|---|---|---|---|
| | | Appearance of Suspension | Degree of clotting on PUF | | | |
| 1a GEN-F | 60 mL $H_2O$/ 13.3 g PAC/ 8.3 mL Ige/ 40 mL Adh | Good | − | 24.7 | 1.2259 | 284 |
| 1b FOAMX | 60 mL $H_2O$/ 13.3 g PAC/ 8.3 mL Ige/ 40 mL Adh | Good | − | 54.9 | 0.8723 | 116 |
| 2a GEN-F | 60 mL $H_2O$/ 22.4 g PAC/ 16.7 mL Ige/ 40 mL Adh | Good | − | 8.80 | 1.7728 | 653 |
| 2b FOAMX | 60 mL $H_2O$/ 22.35 g PAC/ 16.7 mL Ige/ 40 mL Adh | Good | − | 34.2 | 1.1093 | 201 |
| 3a GEN-F | 50 mL $H_2O$/ 22.35 g PAC/ 16.7 mL/ 50 mL Adh | Good | − | 8.00 | 1.9910 | 644 |

TABLE 4-continued

Inhibition of Phenol Binding by Igepal Treatment of PAC.

| | | Observations of Preparation | | Final | | |
|---|---|---|---|---|---|---|
| | Protocol | Appearance of Suspension | Degree of clotting on PUF | Phenol Conc., ppm | Grams composite | Alpha Value |
| 3b FOAMX | 50 mL H$_2$O/ 22.7 g PAC/ 16.7 mL/ 50 mL Adh | Good | – | 44.0 | 2.0145 | 149 |

Adh = Adhesive, Synthemul; Initial phenol concentration = 110.6 ppm.

Example 6

Purpose of experiment:

To demonstrate that even more than the non-ionic surfactants, cationic surfactants have unacceptable properties. In these experiments the ability of mixed alkyl trimethyl ammonium bromide (ATAB) to perform as a suspension aid was investigated. We found that the ATAB does not act to yield a suspension of PAC in the latex adhesive but rather induces even more severe clumping of the PAC than what occurred when the ATAB was not added. The experiment was performed as follows: To 28 mL of rapidly stirring water in each of three separate beakers was added, in order, 8.94 g PAC (then stirred 3 min. to suspend the PAC), either 0.05, 1.25 or 2.5 g ATAB (then stirred 1 min to dissolve), and finally 12 mL Synthemul adhesive. All three attempted suspensions exhibited severe clumping, with the experiment with 2.5 g ATAB yielding almost complete separation of the PAC from the suspension. The experiment with the 1.25 g of ATAB was carried further, with the material used to coat a 1"×1"×1" cube of General Foam. upon curing and assay, the calculated alpha value was 758. The overall conclusion from this set of experiments is that a cationic surfactant works against maintenance of a suspension (it induces clumping of the PAC) as well as tending to inhibit phenol binding by the PAC.

TABLE 5

Inhibition of Phenol Binding by ATAB Treatment of PAC. 8.94 g PAC suspended 28 mL H$_2$O, then 1.25 g ATAB added, then 12 mL Synthemul. General Foam used as support.

| | Observations of Preparation | | Final | | |
|---|---|---|---|---|---|
| | Appearance of Suspension | Degree of clotting on PUF | Phenol Conc., ppm | Weight composite, g | Alpha Value |
| 1 | Very Severe clotting | +++ | 12.99 | 0.9281 | 753 |

Initial phenol concentration = 103.8 ppm

Example 7

Purpose of experiment:

This series of experiments demonstrate that the only acceptable surfactant for maintenance of a suspension in Synthemul without excessive inhibition of the phenol binding ability of the PAC is an anionic surfactant. When the anionic surfactant, Dowfax 2A1, was employed, not only was clumping of the PAC eliminated but phenol binding activity was greatly maintained. The experiment was performed as follows. The experiments was run as four sets. The "a" experiment in each set used 13000 series General foam as the substratum while the "b" experiment used Scott Blue Foamex. In all of these experiments, PAC was added to rapidly stirring water followed by surfactant, then the adhesive and finally the PUF substratum. Prior to the experiments described in the table, we determined the minimum amount of surfactant required to maintain an un-clumped suspension for the amount of PAC utilized. As can be seen in the following table, all four formulations of water, PAC, Dowfax surfactant and Synthemul adhesive (using either General Foam or Foamex as substratum) yielded high activity composites. The General foam always yields a higher alpha value composite than the Foamex due to greater surface area resulting from greater pores per inch and a resultant greater weight gain.

Excess surfactant tends to decrease the phenol binding ability of the composite-bound PAC. Thus, it can be seen by comparing the alpha values for experiments 1a and 1b to 3a and 3b that increasing the amount of adhesive from 6.25 to 8.34 mL in the described experiments the alpha value decreases in magnitude by almost 50 % This indicates the importance of employing the minimum amount of surfactant required to maintain the PAC in suspension. Increasing the surfactant concentration decreases the phenol binding ability, as measured by the alpha value. A similar conclusion may be drawn when experiments 2a and 2b are compared to 4a and 4b, where half the amount of adhesive was employed as was in 1a, 1b, 3a and 3b. The conclusion from this set of experiments is that an anionic surfactant works well at maintaining a suspension of PAC in the carboxylated polyacrylate adhesive latex. At first glance, it appears that excess surfactant simply inhibits the adsorption of phenol by the PAC. However, the lower weight in the final composite observed when a greater amount of surfactant is used demonstrates a lower amount of slurry, and therefore lower amount of PAC, is present on those composites. Thus, although the surfactant does indeed appear to exhibit modest inhibition of the phenol binding properties of the PAC a contribution factor is that the increase in surfactant decreases the quantity of PAC bound to the PUF support. Less PAC yields less phenol adsorbing power.

TABLE 6

Effect on Phenol Binding by Dowfax 2A1 Treatment of PAC.

| | | Observations of Preparation | | Final | | |
|---|---|---|---|---|---|---|
| | Protocol | Appearance of Suspension | Degree of clotting on PUF | Phenol Conc., ppm | Grams composite | Alpha Value |
| 1a GEN-F | 60 mL H$_2$O/ 22.35 g PAC/ 6.3 mL 2A1/ 40 mL Adh | Good | – | 0.43 | 2.4247 | 9789 |
| 1b FOAMX | SAME | Good | – | 10.91 | 0.9900 | 837 |
| 2a GEN-F | 80 mL H$_2$O/ 22.35 g PAC/ 6.3 mL 2A1/ 20 mL Adh | Good | – | 0.38 | 2.7849 | 9486 |
| 2b FOAMX | SAME | Good | – | 12.63 | 0.8346 | 841 |
| 3a GEN-F | 60 mL H$_2$O 22.35 g PAC/ 8.3 mL 2A1/ 40 mL Adh | Good | – | 1.19 | 1.6518 | 5093 |
| 3b FOAMX | SAME | Good | – | 16.56 | 1.0141 | 504 |
| 4a GEN-F | 80 mL H$_2$O/ 22.35 g PAC/ 8.3 mL 2A1/ 20 mL Adh | Good | – | 1.42 | 1.3719 | 5127 |
| 4b FOAMX | SAME | Good | – | 19.38 | 0.8202 | 515 |

Adh = Adhesive, Synthemul; 2A1 = Dowfax 2A1 surfactant; Initial phenol concentration = 101.3 ppm.

Example 8

Purpose of experiment:

To extend this discovery to another anionic surfactant. In this example we tested Dowfax 8390. The Dowfax 8390 is composed of disodium hexadecyldiphenyloxide disulfonate and disodium dihexadecyldiphenyloxide disulfonate. The procedure followed was the same as in example 7.

When either 1 or 1.5 mL of either Dowfax 8390 or Dowfax 3B2 were employed in the following tests, the PAC aggregated to an unacceptable level. These composites were not assayed for phenol binding ability.

TABLE 7

Effect on Phenol Binding by Dowfax 8390 Treatment of PAC.

| | | Observations of Preparation | | Final | | |
|---|---|---|---|---|---|---|
| | Protocol | Appearance of Suspension | Degree of clotting on PUF | Phenol Conc., ppm | Grams composite | Alpha Value |
| 1a GEN-F | 16.8 mL H$_2$O/ 5.4 g PAC/ 2.0 mL 8390/ 7.2 mL Adh | Good | – | 0.26 | 2.8719 | 13506 |
| 1b FOAMX | SAME | Good | – | 4.97 | 1.1349 | 1711 |
| 2a GEN-F | 16.8 mL H$_2$O/ 5.4 g PAC/ 2.5 mL 8390/ 7.2 mL Adh | Good | – | 0.95 | 1.4164 | 7481 |
| 2b FOAMX | SAME | Good | – | 20.46 | 0.8442 | 469 |

TABLE 7-continued

Effect on Phenol Binding by Dowfax 8390 Treatment of PAC.

| | | Observations of Preparation | | Final | | |
|---|---|---|---|---|---|---|
| | Protocol | Appearance of Suspension | Degree of clotting on PUF | Phenol Conc., ppm | Grams composite | Alpha Value |
| 3a GEN-F | 16.8 mL H$_2$O/ 5.4 g PAC/ 3.0 mL 8390/ 7.2 mL Adh | Good | — | 1.72 | 1.2189 | 4759 |
| 3b FOAMX | SAME | Good | — | 22.49 | 1.0141 | 504 |

Adh = Adhesive, Synthemul; 8930 = Dowfax 8930 surfactant; Initial phenol concentration = 101.5 ppm.

The conclusions drawn are the same as for example 7.

Example 9

Purpose of experiment:

To extend this discovery to yet another anionic surfactant. In this example we tested Dowfax 3B2. The Dowfax 3B2 is composed of disodium decyl(sulfophenoxy)benzenesulfonate and disodium oxybis(decylbenzenesulfonate). The procedure followed was the same as in example 7.

As what was observed with the Dowfax 8390, when either 1 or 1.5 mL of Dowfax 3B2 was employed in the following test, the PAC aggregated to an unacceptable level. These composites were not assayed for phenol binding ability.

time not inhibiting the phenol binding of the final composite. In this example we tested N-Dodecyl-N,N-Dimethyl-3-Amino-1-Propanesulfonate (DDAP). This compound functions as a surfactant with both a cationic and anionic component to the molecule. The procedure followed was the same as in example 7. The PUF employed in these tests was 13000 series General foam.

Similar to what was observed for the tests employing the anionic surfactants Dowfax 8390 or 3B2, we found that the lower amounts of DDAP surfactant (1.2 and 1.5 g) did not prevent clotted of the PAC suspensions, with resultant clumping on the surface of the PUF cubes and lower weight gain of the PUF (see 1 and 2 in Table 9). The Alpha value increased in magnitude with increased DDAP and the result-

TABLE 8

Effect on Phenol Binding by Dowfax 3B2 Treatment of PAC.

| | | Observations of Preparation | | Final | | |
|---|---|---|---|---|---|---|
| | Protocol | Appearance of Suspension | Degree of clotting on PUF | Phenol Conc., ppm | Grams composite | Alpha Value |
| 1a GEN-F | 16.8 mL H$_2$O/ 5.4 g PAC/ 2.0 mL 3B2/ 7.2 mL Adh | Good | — | 0.70 | 2.1850 | 6590 |
| 1b FOAMX | SAME | Good | — | 23.17 | 0.8357 | 405 |
| 2a GEN-F | 16.8 mL H$_2$O/ 5.4 g PAC/ 2.5 mL 3B2/ 7.2 mL Adh | Good | — | 2.20 | 1.4439 | 3126 |
| 2b FOAMX | SAME | Good | — | 22.98 | 0.9217 | 371 |
| 3a GEN-F | 16.8 mL H$_2$O/ 5.4 g PAC/ 3.0 mL 3B2/ 7.2 mL Adh | Good | — | 33.08 | 0.7770 | 2913 |
| 3b FOAMX | SAME | Good | — | 2.47 | 1.3763 | 266 |

Adh = Adhesive, Synthemul; 8930 = Dowfax 8930 surfactant; Initial phenol concentration = 101.5 ppm.

The conclusions drawn are the same as for examples 7 and 8.

Example 10

Purpose of experiment:

To determine if a zwitterionic surfactant could be employed to prevent aggregation of PAC while at the same ant lower clotting and increased PUF weight gain. Use of 1.8 g of DDAP eliminated the clotting entirely (3 in Table 9). The performance of this surfactant is not overly dissimilar to that observed in example 9 for the anionic surfactant Dowfax 3B2. However, the highest alpha value obtained (3280 when General foam is employed as substratum) is still well below the 10,000 to 13,000 range obtained with the anionic surfactants. This would appear to be mostly due to the lower quantity of slurry bound to the PUF substratum (refer to the weight of composites).

TABLE 9

Inhibition of Phenol Binding by N-Dodecyl-N,N-Dimethyl-3-Amino-1-Propanesulfonate Treatment of PAC.

| Protocol | Observations of Preparation | | | | |
|---|---|---|---|---|---|
| | Appearance of Suspension | Degree of Clotting on PUF | Final Phenol Conc., ppm | Grams Composite | Alpha Value |
| 1  16.8 mL H₂O\ 5.4 g PAC\ 1.2 g DDAP\ 7.2 mL Adh | Severe Clotting | +++ | 12.8 | 1.0360 | 632 |
| 2  16.8 mL H₂O\ 5.4 g PAC\ 1.5 g DDAP\ 7.2 mL Adh | Clotting | ++ | 3.2 | 1.3730 | 2126 |
| 3  16.8 mL H₂O\ 5.4 g PAC\ 1.8 g DDAP\ 7.2 mL Adh | Good | – | 1.39 | 2.0884 | 3280 |
| 4  16.8 mL H₂O\ 5.4 g PAC\ 2.4 g DDAP\ 7.2 mL Adh | Good | – | 2.80 | 1.6216 | 2066 |

Adh = Adhesive, Synthemul; DDAP = N-Dodecyl-N,N-Dimethyl-3-Amino-1-Propanesulfonate surfactant; Initial phenol concentration = 96.6 ppm.

Example 11

Purpose of experiment:

To determine if a linear alkyl sulfonate surfactant has properties similar to the other anionic surfactants in preventing clotting and not overly inhibiting the phenol binding activity of the final PAC composite. General foam was used in this example since application of slurry onto this small-pore foam more readily reveals clotting of the PAC than is revealed when a large pore foam, such as Scott Blue Foamex, is used. The procedure for preparing the slurry and coating it onto the PUF is the same as that described previously. To the water was added the surfactant solution (9 g SDS brought to 100 mL with deionized water) followed by the PAC and finally the Synthemul adhesive (55 to 57% solids). As can be seen by inspection of the following table all concentrations of SDS resulted in moderate clumping of PAC in the suspension and severe clumping of the PAC on the surface of the cubes of General foam. It appears that the SDS acts to inhibit the binding of phenol by the PAC since formation of the composite from slurries with decreasing amounts of surfactant yielded higher activity composites. That is, the composite prepared with the lowest concentration of surfactant possessed an alpha value four times higher than the composite prepared with three times greater surfactant concentration. The conclusion from this work is that although disulfonated anionic surfactants, such as Dowfax 2A1 and 3B2, perform well, linear monosulfonated surfactants do not. The reason for this is not clear. Possible reasons for the superior performance of the disulfonated surfactant are:

1. Increased charge density of two charged groups in close proximity.
2. Greater electrolytic strength of disulfonated surfactants relative to monosulfonated.
3. The presence of an ether linkage in the disulfonated Dowfax surfactants allowing better conformational adaptation, and therefore tighter interactions with target ions/surfaces.
4. Improved stabilization of latex particles resulting from more efficient latex particle coverage and higher charge density with the disulfonated surfactants.

TABLE 10

Effect on Coating Appearance and Phenol Binding by Sodium Dodecylsulfate pretreatment of PAC.

| Protocol | Observations of Preparation | | Final Phenol Conc., ppm | Grams Composite | Alpha Value |
|---|---|---|---|---|---|
| | Appearance of Suspension | Degree of Clotting on PUF | | | |
| 1  0 mL H₂O\ 16.8 mL Surf\ 5.4 g PAC\7.2 mL Adh | Moderate Clotting | +++ | 5.56 | 1.6998 | 993 |
| 2  4.2 mL H₂O\12.6 mL Surf\5.4 g PAC\ 7.2 mL Adh | Moderate Clotting | +++ | 5.22 | 1.4711 | 1226 |
| 3  7.4 mL H₂O\9.5 mL Surf\5.4 g PAC\7.2 mL Adh | Moderate Clotting | +++ | 2.47 | 1.8942 | 2072 |
| 4  9.7 mL H₂O\ 7.1 mL Surf\ 5.4 g PAC\ 7.2 mL Adh | Moderate Clotting | +++ | 1.82 | 1.5317 | 3500 |
| 5  11.55 mL H₂O\5.3 mL Surf\5.4 g PAC\7.2 mL Adh | Moderate Clotting | +++ | 1.63 | 1.4983 | 4003 |

"+++": is the most severe clumping of PAC on the foam; Adh = Adhesive, Synthemul; Surf = Surfactant solution consisting of 9 g sodium dodecylsulfate dissolved in water brought to a total volume of 100 mL. Initial phenol concentration = 99.4 ppm.

Example 12

The experiments of Example 12 relate to the use of ammonium caseinate as a suspension aid. Results described below establish the superior performance of supports formed with the caseinate.

Ammonium caseinate solution was prepared as follows. To 200 mL of rapidly stirring deionized water was added 5 g type HC-200 hydrochloric cascin (National Casein Co., Chicago Ill.) followed by 1 mL of an ammonium hydroxide solution made from 68.49 mL of a 29.2% w/w (sp.g., 0,899) of ammonia water and the solution brought to 100 mL with deionized water. This solution was formed within about 0.5 h.

Slurries containing the ammonium caseinate as a suspension aid were prepared as follows. To 25 mL of a stirring solution of the ammonium caseinate solution was added 12.5 g PAC. Stirring was continued (a few minutes) until a smooth suspension was obtained. To this stirring mixture was added 6.25 g of Synthemul 40404 latex adhesive (or Hycar) followed by 11.75 mLs water and the suspension stirred for an additional 15 min.

Slurries containing the Dowfax 2A1 as a suspension aid were prepared in a similar fashion.

In all of the experiments below, a 1"×1"×1" cube of 13000 series General Foam was squeezed under the stirring slurry to remove air and then passed between two rollers set a distance of 2.11 mm to remove excess slurry.

The results of the experiments that follow are compiled in the attached table.

The purpose of experiment No. 1 was to demonstrate that an active, stable composite could be prepared by first air drying a cube of slurry-coated PUF, followed by heating to a temperature of 150° C. without detriment. The slurry-coated PUF was prepared using ammonium caseinate, Hycar, and type C PAC as described above. The sample was then allowed to air dry for 18 hours and then heated at 150° C. for 10 min immediately prior to the phenol binding assay. The resulting composite displayed excellent phenol binding properties and appeared quite stable in water. The high alpha value obtained for the composite is the best obtained. The 150° C. cure step is not detrimental to the binding activity of the composite. The purpose of experiment No. 3 was to demonstrate that heating an air dried composite at 150° is not essential and may be replaced by air drying at ambient temperature (about 22° C.). This sample was prepared in a fashion similar to No.1 except that the slurry-coated PUF cube was air dried for 48 hrs and then dried in a vacuum oven at 30° C. for 18 hrs. The resulting composite displayed excellent phenol binding properties and appeared quite stable in water. The alpha value obtained from the phenol assay is essentially equal to that obtained in experiment No. 1. Please note that the drying step in the vacuum oven is not essential for the practice of this invention and only serves to drive off moisture so that an accurate dry weight of the sample may be obtained. Other preparations that were not vacuum dried displayed characteristics essentially identical to those that were only air dried (for >48 hrs). The purpose of experiments 5, 6 and 7 was to demonstrate that heating the slurry at 150° C. as the sole curing step is inadequate in properly curing the slurry-coated PUF as measured by its lack of resistance to sloughing off in an aqueous system. Slurry-coated cubes of PUF were prepared as described above. For experiment 5, a freshly coated cube was placed into an oven set for 150° C. and cured for 10 min. Upon removal from the oven, it was cooled to room temperature (for about one minute) and then placed into phenol binding solution. By the end of the assay the phenol solution was very milky with a large portion of the PAC present in the supernatant fraction. This is clearly indicative of inadequate cure time resulting in poor adhesion of the latex adhesive and PAC. Experiment 6 was the same as 5 except that the slurry-coated cube of PUF was allowed to air dry 24 hrs after the heating step but before the assay. Experiment 7 was the same as 5 except that the slurry-coated cube of PUF was air dried for 24 hrs prior to the 10 min heat step. In both of these latter examples the resulting composites displayed excellent phenol binding properties and appeared quite stable in water. The alpha values obtained from the phenol assays is essentially equal to that obtained in experiment No. 1.

The purpose of experiment 8 was to demonstrate that Synthemul 40404 latex adhesive may be substituted for the Hycar adhesive used in experiment 2. The composite was prepared as in experiment 2 except for the substitution. The resulting composite displayed excellent phenol binding properties and appeared quite stable in water. The alpha value obtained from the phenol assay is essentially equal to that obtained in experiment No. 1.

The purpose of experiment 9 was similar to that of experiment 8. Its purpose was to demonstrate that Synthemul 40404 latex adhesive may be substituted for the Hycar adhesive used in experiment 3. The composite was prepared as in experiment 3 except for the substitution. The resulting composite displayed excellent phenol binding properties and appeared quite stable in water. The alpha value obtained from the phenol assay is essentially equal to that obtained in experiment No. 1. Experiments 11 and 12 were, respectively, identical to experiments 1 and 6, except that casein was replaced by Dowfax 2A1. Although the resulting composite appeared quite stable in water the alpha value obtained from the phenol assay was lower than that obtained when casein is employed as the suspension aid.

COMPARISON OF USE OF AMMONIUM CASEINATE AND DOWFAX 2A1 AS SUSPENSION AIDS

| EXPT NO | SUSPEN AID | DRY MTHD | ADHV TYPE | PAC TYPE | INIT PHENOL CONC. PPM | FINAL PHENOL CONC. PPM | GM CMPOSIT GM | ALPHA VALUE |
|---|---|---|---|---|---|---|---|---|
| 1 | *NH$_4$ CASE | A | HYCAR | C | 96.2 | 0.182 | 1.5342 | 34387 |
| 2 | NH$_4$ CASE | A | HYCAR | BL | 96.2 | 0.253 | 1.6759 | 22629 |
| 3 | NH$_4$ CASE | B | HYCAR | C | 90.3 | 0.234 | 1.8023 | 21356 |
| 4 | NH$_4$ CASE | B | HYCAR | BL | 90.3 | 0.231 | 1.5839 | 24617 |
| 5 | ▲NH$_4$ CASE | C | SYNTH | C | 97.0 | 0.433 | 0.9818 | 22713 |
| 6 | NH$_4$ CASE | A | SYNTH | C | 101.8 | 0.266 | 1.4158 | 26953 |
| 7 | NH$_4$ CASE | D | SYNTH | C | 101.8 | 0.217 | 1.4345 | 32624 |

COMPARISON OF USE OF AMMONIUM CASEINATE AND DOWFAX 2A1 AS SUSPENSION AIDS

| EXPT NO | SUSPEN AID | DRY MTHD | ADHV TYPE | PAC TYPE | INIT PHENOL CONC. PPM | FINAL PHENOL CONC. PPM | GM CMPOSIT GM | ALPHA VALUE |
|---|---|---|---|---|---|---|---|---|
| 8  | NH$_4$ CASE | A | SYNTH | BL | 96.2 | 0.412 | 1.4027 | 16575 |
| 9  | NH$_4$ CASE | B | SYNTH | C  | 96.6 | 0.222 | 1.5923 | 27265 |
| 10 | NH$_4$ CASE | B | SYNTH | BL | 90.3 | 0.258 | 1.5342 | 22748 |
| 11 | ▲DOWFAX     | A | HYCAR | C  | 96.2 | 1.114 | 1.4795 | 5769  |
| 12 | DOWFAX      | A | SYNTH | C  | 96.2 | 0.638 | 1.9577 | 7651  |

♦DRYING METHODS:
A. AIR DRY 18 HRS + 150° C. OVEN FOR 10 MIN
B. AIR DRY 48 HRS + 30° C. VACUUM OVEN FOR 18 HRS
C. 150° C. OVEN FOR 10 MIN
D. 150° C. OVEN FOR 10 MIN + AIR DRY 24 HRS
♥ADHV = ADHESIVE, I.E., HYCAR IS HYCAR 2671 FROM BF GOODRICH; SYNTH IS SYNTHEMUL 40404–00 FROM REICHOLD CHEMICAL.
*NH$_4$ CASE = AMMONIUM CASEINATE; ▲DOWFAX = DOWFAX 2A1 SURFACTANT
▲NOTE: ADHESIVE & PAC WAS RELEASED INTO THE SUPERNATANT FRACTION DURING THE BINDING ASSAY; THIS DID NOT OCCUR WITH ANY OF THE OTHER SAMPLES.
ASSAY VOLUME = 100 mls

What is claimed is:

1. A biologically active support for removal of pollutants from a fluid stream comprising:
   (a) a coated support which comprises a polymeric foam substrate having applied thereto, at least in part, a coating composition comprising at least one particulate adsorbent which adsorbs, then releases said pollutants; and at least one polymeric latex binder that binds said adsorbent to the surface of said substrate and has a $T_g$ of lower than or equal to about 25° C. and contains ammonium caseinate as a suspension aid and;
   (b) one or more pollutant-degrading microorganisms adhered to the surface of said coated support.

2. The support of claim 1 wherein the adsorbent is selected from the group consisting of coal, carbon black, activated carbon, silica gel, and activated clays.

3. The support of claim 2 wherein the adsorbent is activated charcoal.

4. The support of claim 1 wherein the adsorbent is a zeolite.

5. The support of claim 1 wherein the adsorbent is a molecular sieve.

6. The support of claim 1 wherein the adsorbent is selected from the group consisting of hydrophobic and ion exchange resins.

* * * * *